(12) United States Patent
Murakami et al.

(10) Patent No.: US 8,059,515 B2
(45) Date of Patent: Nov. 15, 2011

(54) OPTICAL PICKUP APPARATUS

(75) Inventors: Shinzoh Murakami, Osaka (JP);
Takehiro Shiomoto, Osaka (JP);
Katsushige Masui, Osaka (JP); Osamu Hamaoka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 61 days.

(21) Appl. No.: 12/581,434

(22) Filed: Oct. 19, 2009

(65) Prior Publication Data
US 2010/0097919 A1    Apr. 22, 2010

(30) Foreign Application Priority Data

Oct. 17, 2008 (JP) ................................ P2008-268437

(51) Int. Cl.
*G11B 7/135* (2006.01)

(52) U.S. Cl. ............ 369/112.07; 369/112.12; 369/44.41

(58) Field of Classification Search ........................ None
See application file for complete search history.

(56) References Cited

U.S. PATENT DOCUMENTS

| | | | |
|---|---|---|---|
| 5,608,695 A * | 3/1997 | Yamazaki | 369/44.12 |
| 6,185,167 B1 | 2/2001 | Arai et al. | |
| 6,418,107 B1 * | 7/2002 | Sano et al. | 369/109.02 |
| 2005/0002313 A1 * | 1/2005 | Hayashi | 369/112.03 |
| 2005/0105182 A1 * | 5/2005 | Kato et al. | 359/569 |

FOREIGN PATENT DOCUMENTS

JP    11-73658    3/1999

* cited by examiner

*Primary Examiner* — Christopher R Lamb
(74) *Attorney, Agent, or Firm* — Nixon & Vanderhye P.C.

(57) ABSTRACT

Provided is an optical pickup apparatus that can be made compact and is capable of producing stable push-pull signals. The optical pickup apparatus includes a light source, an objective lens, a diffraction element, a light-receiving element, and a control-driving section. The diffraction element receives light reflected from an optical recording medium. The light-receiving element receives light beams diffracted by the diffraction element. The light-receiving element has a plurality of light-receiving regions. The light-receiving region produces an output signal responsive to the quantity of the incident light beam. The control-driving section obtains differences among the output signals from a plurality of the light-receiving regions by calculation to derive a push-pull signal, and drives the objective lens under control on the basis of the push-pull signal.

11 Claims, 15 Drawing Sheets

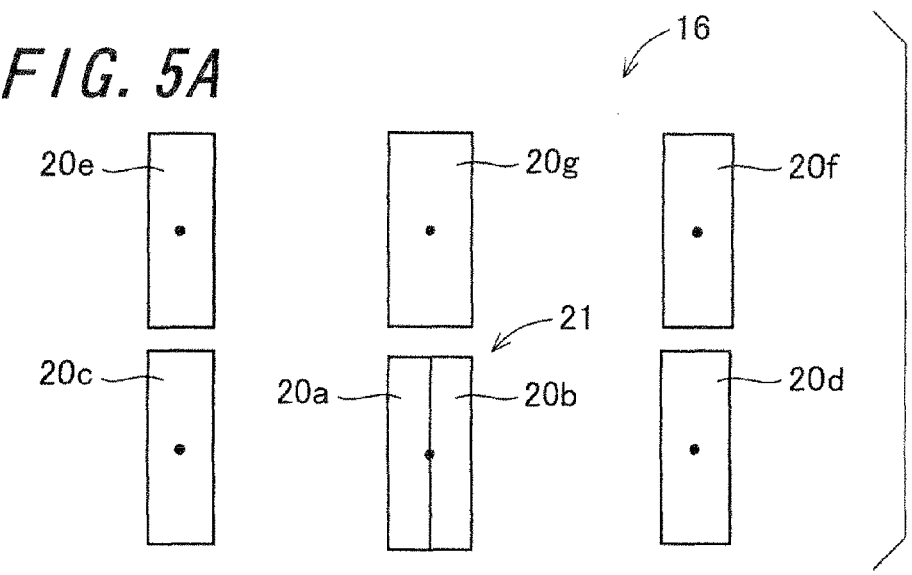
FIG. 5A
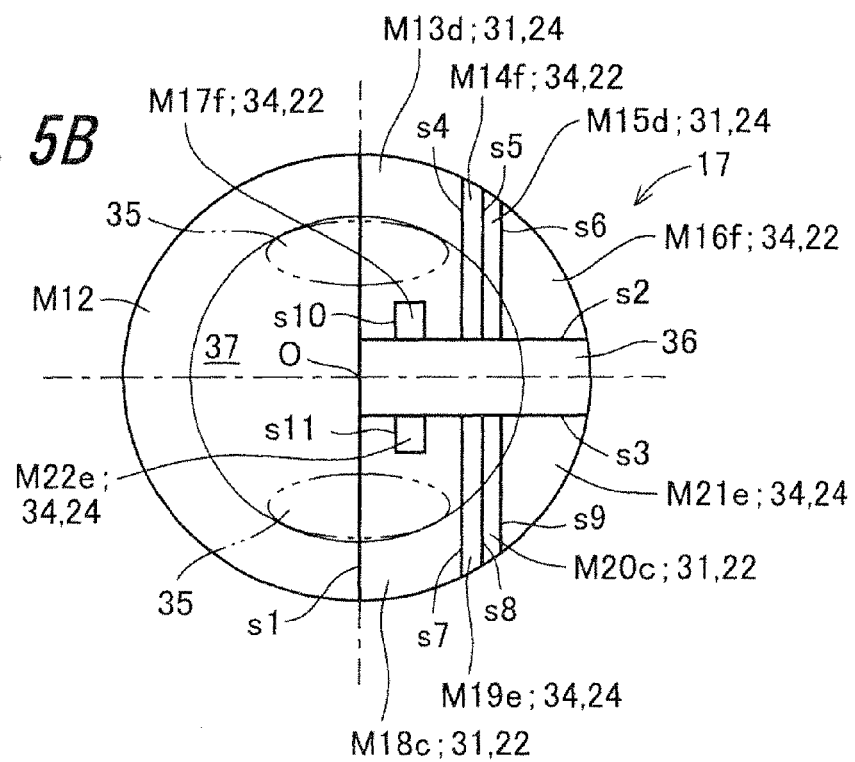
FIG. 5B
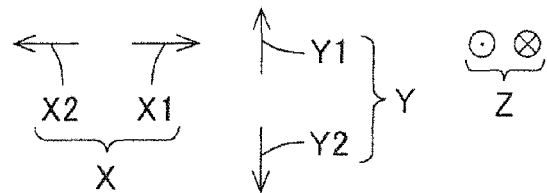

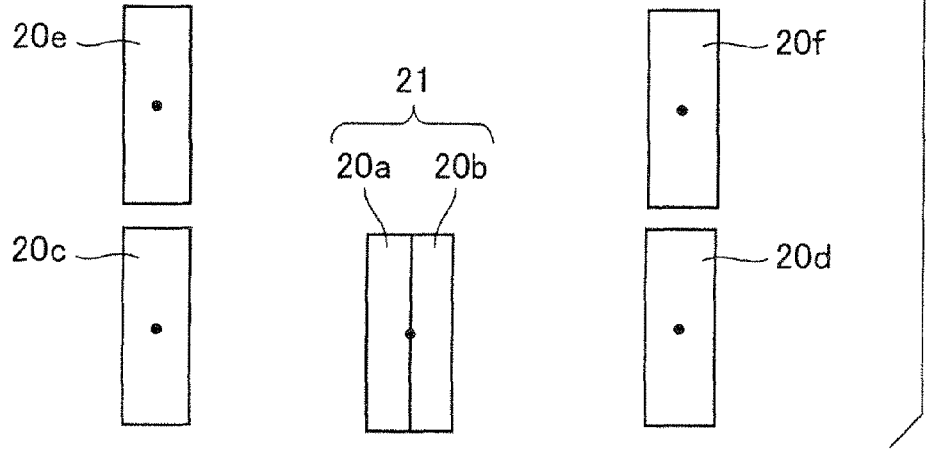
FIG. 7A
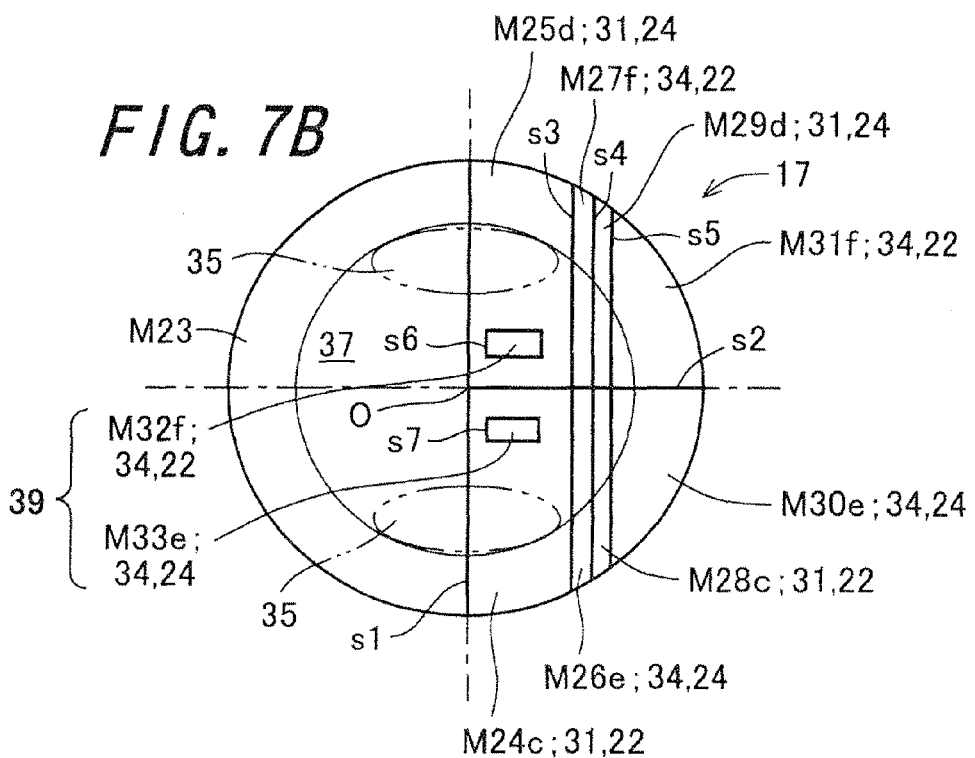
FIG. 7B
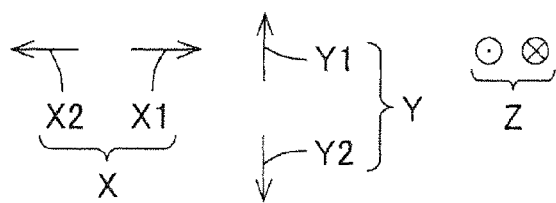

OPTICAL PICKUP APPARATUS

CROSS-REFERENCE TO RELATED APPLICATION

This application claims priority to Japanese Patent Application No. 2008-268437, which was filed on Oct. 17, 2008, the contents of which are incorporated herein by reference in their entirety.

BACKGROUND AND SUMMARY

1. Field of the Technology

The present technology relates to an optical pickup apparatus which is installed in information processing equipment for performing at least one of information recording process, information reproducing process, information erasing process, and information rewriting process on an optical recording medium, and the optical pickup apparatus acts to emit light to the optical recording medium as well as to receive light reflected from the optical recording medium.

2. Description of the Related Art

An optical pickup apparatus is designed to effect emission and reception of light for an optical recording medium such for example as Compact Disk (CD for short), Digital Versatile Disk (DVD for short), and Btu-ray Disk (BD for short). The optical pickup apparatus is installed in information processing equipment for performing at least one of information recording process, information reproducing process, information erasing process, and information rewriting process on the optical recording medium. A semiconductor laser element is mounted in the optical pickup apparatus to effect emission and reception of light for use in information processing operation to be performed on the optical recording medium.

For optical disks of so-called CD-type, such as CD and recordable CD, adaptable to at least one of information recording process, information reproducing process, information erasing process, and information rewriting process that are performed by information processing equipment, a laser light source for emitting light having an emission wavelength close to 780 nm is used to execute signal processing. On the other hand, for optical disks of so-called DVD-type such as DVD and recordable DVD, a laser light source for emitting light having an emission wavelength close to 650 nm is used to execute signal processing. In addition, for BD, a laser light source for emitting light having a wavelength close to 405 nm is used to execute signal processing.

There has recently been an increasing demand for an optical pickup apparatus capable of performing processing operation on optical recording media of different types with adaptability to several wavelengths. However, as compared with an optical pickup apparatus designed to perform processing operation on an optical recording medium of a specific type, the one having the aforestated capability is made complicated in structure and grows in size. As a related art devised to overcome this problem, there is a known technology to implement an optical system common to focus error detection and radial error detection refer to Japanese Unexamined Patent Publication JP-A 11-73658 (1999), for example).

FIGS. 13A and 13B are plan views showing a light-receiving element and a diffraction element 1 of an optical pickup apparatus pursuant to the related art as viewed in a direction of optical axis Z. Specifically, FIG. 13A is a plan view of the light-receiving element, and FIG. 13B is a plan view of the diffraction element as viewed in the optical axis direction Z. The diffraction element 1 acts to diffract backward light, which is light reflected back from an optical recording medium, to direct ± first order diffraction light toward the light-receiving element. The diffraction element 1 has a circular outer shape, and is placed with its center O located at a position passing through the optical axis of the optical pickup apparatus. Moreover, the diffraction element 1 is divided into six regions by a first dividing line 3 extending in a tangential direction while passing through the center O and a second dividing line 4 and a third dividing line 5 that are each perpendicular to the first dividing line 3. On the other hand, the light-receiving element is divided into first to eighth regions R1 to R8, of which the second region R2, the fourth region R4, the sixth region R6, and the eighth region RB are each subdivided into three small regions a, b, and c.

In FIG. 13B, a right-left direction as viewed in the paper sheet with FIG. 13B printed thereon will be defined as the tangential direction, and a top-bottom direction as viewed in the paper sheet will be defined as a radial direction, which is a direction radially of the circular plate-shaped optical recording medium. The radial direction is perpendicular to the tangential direction. In a strict sense the radial direction comprises two opposite directions, namely one radial direction which is an upward direction as viewed in the paper sheet and the other radial direction opposite from one radial direction. Out of the second and third dividing lines 4 and 5 extending in parallel with the radial direction, the one located on the one-tracking-direction side (of the diffraction element) is the second dividing line 4.

Out of the six separate regions of the diffraction element 1 shown in FIG. 13B, the one radial direction-side region located at extreme one-tangential-direction position and the one radial direction-side region located at extreme the other-tangential-direction position correspond to, of the eight regions of the light-receiving element, the first region R1 and the fifth region R5. A beam of light which enters these regions is condensed so as to be focused on a light-receiving surface of the light-receiving element.

Out of the six separate regions of the diffraction element 1 shown in FIG. 13B, the other radial direction-side region located at extreme one-tangential-direction position and the other radial direction-side region located at extreme the other-tangential-direction position correspond to, of the eight regions of the light-receiving element, the third region R3 and the seventh region R7. A beam of light which enters these regions is condensed so as to be focused on the light-receiving surface of the light-receiving element.

Out of the six separate regions of the diffraction element 1 shown in FIG. 13B, the one radial direction-side region located centrally in the tangential direction corresponds to, of the eight regions of the light-receiving element, the second region R2 and the eighth region R8. A beam of light which enters these regions is condensed so as to be focused farther than the light-receiving surface of the light-receiving element from the diffraction element 1.

Out of the six separate regions of the diffraction element 1 shown in FIG. 13B, the other radial direction-side region located centrally in the tangential direction corresponds to, of the eight regions of the light-receiving element, the fourth region R4 and the sixth region R6. A beam of light which enters these regions is condensed so as to be focused closer than the light-receiving surface of the light-receiving element to the diffraction element 1. As employed herein, "correspond to" means that reflected backward light diffracted in each of the regions of the diffraction element 1 enters its respective region of the light-receiving element.

If forward light entering the optical recording medium travels radially across a track of the optical recording medium, a significant luminance variation will result in two areas located tangentially centrally but spaced apart radially. In FIG. 13B, such an area which exhibits a significant luminance variation is encircled by a chain double-dashed line. In the diffraction element 1, in other areas than the area exhibiting a significant luminance variation, even if the forward light travels radially across the track, the degree of luminance variation is relatively low. By exploiting a difference in light quantity between a light beam entering the area exhibiting a significant luminance variation and a light beam entering the area exhibiting a slight luminance variation, it is possible to produce a push-pull signal. In response to the push-pull signal thus produced, tracking servomechanism (not represented graphically) is driven thereby to allow radial adjustment of the forward light which enters the optical recording medium.

In the optical pickup apparatus pursuant to the related art, a radial error for tracking servo control is obtained by the differential push pull method using the quantity of a light beam entering each of the regions of the light-receiving element. To be specific, the radial error is calculated in accordance with the following formula:

$$DPP = \{(R4all + R6all) - (R2all + R8all)\} - \\ k \times \{(R1 + R5) - (R3 + R7)\} \\ = MPP - k \times SPP \quad (1)$$

In the formula (1), DPP represents a push-pull signal which is obtainable by the differential push pull method, and R1 to R8 represent the quantities of the light beams entering the first to eighth regions, respectively, of the light-receiving element. Out of the first to eighth regions, the second, fourth, sixth, and eighth regions are each subdivided into three small regions. In the formula (1), R2*all*, R4*all*, R6*all*, and R8*all* represent the quantities of the light beams entering the second region, the fourth region, the sixth region, and the eighth region, respectively, and in a sense, each value represents the sum total of quantities of the light beams entering the three small regions, respectively. Note that, specifically, the quantity of the light beam entering each of the regions of the light-receiving element is expressed as the signal strength of an electric signal outputted through conversion by the light-receiving element.

As shown in the formula (1), MPP is equivalent to (R4*all*+R6*all*)−(R2*all*+R8*all*). In this case, since MPP involves the quantity of the light beam entering the area exhibiting a significant luminance variation, when the forward light entering the optical recording medium travels across the track of the optical recording medium, MPP is caused to vary greatly so as to indicate a radial displacement, or an AC component of a radial error signal.

Moreover, SPP is equivalent to (R1+R5)−(R3+R7). In this case, since SPP does not involve the quantity of the light beam entering the area exhibiting a significant luminance variation, even if the forward light entering the optical recording medium travels across the track of the optical recording medium, SPP is smaller than MPP in the extent of variation in light quantity relative to the amount of radial displacement. Note that k represents a coefficient and, by multiplying SPP by this coefficient, it is possible to render the rate of change of the second term of the formula (1) relative to the amount of deviation of the objective-lens position from the track equal to the rate of change of MPP. On the basis of MPP, SPP, and k, a DC component of the push-pull signal can be produced thereby to reflect a radial error offset upon the push-pull signal. The three small regions obtained by subdividing each of the second, fourth, sixth, and eighth regions of the light-receiving element are used for focus error detection.

Out of the terms constituting the formula (1), (R4*all*+R6*all*) and (R1+R5) ideally stand in positive correlation with each other relative to tracking deviation, in other words, the terms are of the same polarity. Similarly, there is a positive correlation between (R2*all*+R8*all*) and (R3+R7). In a case where (R4*all*+R6*all*) and (R1+R5) representing the quantity of light entering each region of the light-receiving element; that is, the strength of a signal outputted from each region of the light-receiving element, are ideally increased and decreased in a correlative manner, a stable push-pull signal DPP can be produced as a servo signal for radial error correction.

However, if a lack of synchronization occurs between (R4*all*+R6*all*) and (R1+R5) that are fundamentally the same in polarity due to the presence of a foreign matter, a flaw of the optical recording medium, etc. with consequent mutual differences in signal fluctuation, the DPP signal will fluctuate in amplitude, which gives rise to the problem of a failure in stable radial servo control. The degree of deviation of the push-pull signal DPP resulting from a foreign matter, a flaw, or the like may possibly be greater than the radial error-induced variation of the push-pull signal DPP.

FIG. 14 is a plan view of the diffraction element 1 of the optical pickup apparatus of the related art as viewed in the optical axis direction Z, illustrating a shade 2 caused by a foreign matter adherent to the surface of the optical recording medium and how the shade 2 travels. In the presence of a foreign matter or flaw on the optical recording medium, the forward light cannot be reflected properly from the foreign matter- or flaw-bearing part of the optical recording medium, with the result that the quantity of the reflected backward light is decreased. As the optical recording medium is turned, the foreign matter moves tangentially in conjunction with the track relative to the optical pickup apparatus. In FIG. 14, there is shown a case where the foreign matter is circular in shape and has a diameter smaller than the distance between the second dividing line 4 and the third dividing line 5 of the diffraction element 1.

As the foreign-matter shade 2 comes near to the diffraction element 1 where the reflected backward light enters, it is located in, of the three tangentially separated regions, the one assuming extreme the other-tangential-direction position. At this time, the amount of light received by each of the first region R1, the third region R3, the fifth region R5, and the seventh region R7 of the light-receiving element is decreased. When the foreign-matter shade 2 is shifted radially from the position passing through the center of the diffraction element 1, there arises a difference between the sum total of the strengths of signals from the first region R1 and the fifth region R5 of the light-receiving element and the sum total of the strengths of signals from the third region R3 and the seventh region R7 of the light-receiving element. This condition of the optical pickup apparatus of the related art will be referred to as "the first condition".

Next, when the foreign-matter shade 2 is located between the second dividing line 4 and the third dividing line 5 on the diffraction element 1, the amount of light received by each of the second region R2, the fourth region R4, the sixth region R6, and the eighth region R8 of the light-receiving element is decreased. When the foreign-matter shade 2 is shifted radially from the position passing through the center of the diffraction element 1, there arises a difference between the sum total of the strengths of signals from the second region R2 and the eighth region R8 of the light-receiving element and the sum total of the strengths of signals from the fourth region R4 and the sixth region R6 of the light-receiving element. This condition of the optical pickup apparatus of the related art will be referred to as "the second condition". Further, when the foreign-matter shade 2 is located in the region assuming extreme one-tangential-direction position, the amount of light received by each of the first region 21, the third region R3, the fifth region R5, and the seventh region R7 of the light-receiving element is decreased. When the foreign-matter shade 2 is shifted radially from the position passing through the center of the diffraction element 1, there arises a difference between the sum total of the strengths of signals from the first region R1 and the fifth region R5 of the light-receiving element and the sum total of the strengths of signals from the third region R3 and the seventh region R7 of the light-receiving element. This condition of the optical pickup apparatus of the related art will be referred to as "the third condition".

The first to third conditions are separated from one another time. By the timewise differences among the first to third conditions, the increase-decrease relationship between (R4all+R6all) and (R1+R5) of the formula (1) varies with time correspondingly. In consequence, they should ideally be of the same polarity, but cannot perfectly synchronized with each other in reality.

FIGS. 15A to 15C are diagrams showing the quantity of light detected in the light-receiving element when the foreign-matter shade 2 passes through a radially-shifted location on the diffraction element 1 of the optical pickup apparatus of the related art. FIGS. 15A to 15C are charts, showing states where the foreign-matter shade 2 is projected differently onto the diffraction element 1, on which the abscissa represents the tangential position of the foreign-matter shade 2 on the diffraction element 1 and the ordinate represents outputs produced from the light-receiving element. In FIG. 15A, the thick line indicates (R2all+R8all), and the thin line indicates (R1+R5). In FIG. 15B, the thick line indicates (R4all+R6all), and the thin line indicates (R3+R7).

FIG. 15C indicates the values of MPP, k×SPP, and DPP in the formula (1). If, in its tangential movement, the foreign matter travels in a location shifted from the radial center of the diffraction element 1, there arises a lack of synchronization in the outputs from the light-receiving element that should ideally be the same in polarity. As a result, as shown in FIG. 15C, there is a problem that DPP is caused to vary significantly.

A feature of an example embodiment presented herein is to provide an optical pickup apparatus that can be made compact and is capable of producing a stable push-pull signal.

According to the example embodiment, an optical pickup apparatus comprises a light source, an objective lens, a diffraction element, a light-receiving element, and a control-driving section. The objective lens is a lens for condensing light emitted from the light source on a surface of an optical recording medium. The light reflected from the optical recording medium enters the diffraction element. A light beam diffracted by the diffraction element enters the light-receiving element. The light-receiving element has a plurality of light-receiving regions. The light-receiving region produces an output signal responsive to the light quantity of the incident light beam. The control-driving section obtains differences among the output signals produced by a plurality of the light-receiving regions by calculation to derive a push-pull signal, and drives the objective lens under control on the basis of the push-pull signal.

The diffraction element has a forward region and a reverse region. The forward region serves to let a light beam enter, out of a plurality of the light-receiving regions, the one for producing an output signal bearing a same-sign relation to the push-pull signal. The reverse region serves to let a light beam enter, out of a plurality of the light-receiving regions, the one for producing an output signal bearing an opposite-sign relation to the push-pull signal. A plurality of the forward regions and the reverse regions are arranged alternately in one of the directions set for the diffraction element.

By virtue of alternate arrangement of a plurality of the forward regions and the reverse regions in one of the directions set for the diffraction element, in contrast to a case where a plurality of the forward regions and the reverse regions are not arranged in an alternating manner, it is possible to increase the possibility that a foreign-matter shade extends over the forward region and the reverse region adjacent to each other. Accordingly, in terms of the influence of the foreign-matter shade on the push-pull signal, the timewise difference between the output signal corresponding to the forward region and the output signal corresponding to the reverse region can be lessened. This makes it possible to achieve mutual cancellation of the influence of the foreign-matter shade on the forward region and that on the reverse region in the performance of push-pull signal calculation, and thereby suppress push-pull signal fluctuation resulting from the on-the-diffraction-element movement of the foreign-matter shade projected on the diffraction element. Moreover, radial error correction is carried out in accordance with push-pull signal calculation, wherefore the light-receiving element used to read signals recorded on the optical recording medium can be used also for control and driving of the objective lens. In consequence, as compared with a case where the light-receiving element is not adaptable to shared use, reduction in apparatus size can be achieved.

According to the example embodiment, the diffraction element has a bright-dark contrast area and a simple area. The bright-dark contrast area is an area where, of the light beams reflected from the optical recording medium, diffraction reflected light from a track borne on the surface of the optical recording medium enters. The simple area is an area where, of the light beams reflected from the optical recording medium, only simple reflected light from the optical recording medium enters; that is, no diffraction reflected light enters. The light-receiving region has a push-pull light-receiving region and an offset light-receiving region. Moreover, the diffraction element has a first diffraction region and a second diffraction region. The first diffraction region diffracts the incident light so that it can be directed to the push-pull light-receiving region. The second diffraction region diffracts the incident light so that it can be directed to the offset light-receiving region. A plurality of the first diffraction regions and the second diffraction regions are arranged alternately in one of the directions set for the diffraction element.

This makes it possible to decrease the possibility that the foreign-matter shade affects only one of the first diffraction region and the second diffraction region on the diffraction element, and thereby decrease the possibility that the foreign-matter shade affects only one of the push-pull light-receiving region and the offset light-receiving region of the light-receiving element. In this way, with the influence of the quantity of light entering the simple area taken away from the quantity of light entering the bright-dark contrast area on the diffraction element, at the time of push-pull signal calculation, it is possible to eliminate the influence of simple diffraction light entering the bright-dark contrast area, as well as to achieve cancellation of the influences of the foreign-matter shade. In consequence, a higher degree of accuracy in the push-pull signal is achievable compared to the related-art technology.

According to the example embodiment, in the diffraction element, a plurality of the forward regions and the reverse regions are arranged alternately in a tangential direction which corresponds to, out of the directions parallel to the diffraction element, the direction of a line tangent to the track at a position where light condensed by the objective lens enters the surface of the optical recording medium.

Thereby, when the shade of a foreign matter adherent to the surface of the optical recording medium moves in the tangential direction on the diffraction element, at least part of the foreign-matter shade passes through the forward region and the reverse region alternately several times. Accordingly, in terms of the influence of the foreign-matter shade on the push-pull signal, the timewise difference between the output signal corresponding to the forward region and the output signal corresponding to the reverse region can be lessened, wherefore push-pull signal fluctuation resulting from the on-the-diffraction-element movement of the foreign-matter shade projected on the diffraction element can be suppressed. Moreover, it is possible to decrease the possibility that the foreign-matter shade is projected lopsidedly on one side, i.e. one of the forward region and the reverse region. Therefore, the influence of the foreign-matter shade projected on the forward region and that of the foreign-matter shade projected on the reverse region cancel each other out with the consequence that push-pull signal fluctuation resulting from the movement of the foreign-matter shade on the diffraction element can be suppressed.

According to the example embodiment, a shape of the second diffraction region is so determined that a quantity of light entering the second diffraction region is proportional to an amount of deviation of the objective lens from the track.

In this case, in contrast to a case where the quantity of light entering the second diffraction region bears a non-linear relationship with the amount of deviation of the objective lens from the track, the formula used for push-pull signal calculation can be simplified, wherefore computation cost required for push-pull signal calculation can be reduced correspondingly. This makes it possible to obtain a radial error in a short period of time and with high accuracy, as well as to render the time taken for radial error correction as short as possible. Accordingly, the objective lens can be driven under control with higher accuracy.

According to the example embodiment, the diffraction element includes regions of which each constitutes at least part of either of the forward region and the reverse region, and at least part of the regions is rectangularly formed so that the tangential direction becomes its lengthwise direction.

This helps increase the possibility that, in the diffraction element, the foreign-matter shade extends over the forward region and the reverse region adjacent to each other in a radial direction. When the foreign-matter shade extends over the forward region and the reverse region adjacent to each other, in terms of the push-pull signal, the influence of the foreign-matter shade on the forward region and that of the foreign-matter shade on the reverse region can be synchronized with each other. Accordingly, push-pull signal fluctuation resulting from the on-the-diffraction-element movement of the foreign-matter shade projected on the diffraction element can be suppressed. This makes it possible to achieve mutual cancellation of the influence of the foreign-matter shade on the forward region and that on the reverse region.

According to the example embodiment, in the diffraction element, a plurality of the forward regions and the reverse regions are arranged alternately in a radial direction which is parallel to the diffraction element and perpendicular to the tangential direction.

By doing so, in contrast to the case of arranging a plurality of the forward regions and the reverse regions alternately in the tangential direction of the diffraction element, it is possible to easily insure timewise synchronization between the foreign-matter shade's projective entrance to the forward region and its projective entrance to the reverse region. Meanwhile, alternate arrangement of the forward regions and the reverse regions in the tangential direction affords the advantage to decrease the possibility that the foreign-matter shade is projected lopsidedly on one side, i.e. one of the forward region and the reverse region. By contrast, with the alternate arrangement of the forward regions and the reverse regions in the radial direction, the influence of the foreign-matter shade, which is projected so as to extend over the adjacent forward region and reverse region, on the forward region and that on the reverse region can be perfectly synchronized with each other. In consequence, the foreign-matter influence on the forward region and that on the reverse region cancel each other out.

According to the example embodiment, the diffraction regions constitute a first array and a second array. In the first array, a plurality of the forward regions and the reverse regions are arranged alternately in the tangential direction. In the second array, a plurality of the forward regions and the reverse regions are arranged alternately in the radial direction.

This makes it possible to form the first array in that part of the diffraction element in which a phase difference arises between the waveform of the output signal corresponding to the forward region and the waveform of the output signal corresponding to the reverse region, as well as to form the second array in that part of the diffraction element in which the waveform of the output signal corresponding to the forward region and the waveform of the output signal corresponding to the reverse region are in the same phase. Accordingly, in contrast to the case of arranging a plurality of the forward regions and the reverse regions alternately in only one specific direction in the diffraction element, in terms of the influence of the foreign-matter shade on the push-pull signal, the output signal corresponding to the forward region and the output signal corresponding to the reverse region can be synchronized with each other with a higher degree of accuracy. This helps stabilize the push-pull signal even further.

According to the example embodiment, the light-receiving element has an independent light-receiving region, and an output signal from the independent light-receiving region is not used for push-pull signal calculation. The diffraction element includes an independent diffraction region and the second diffraction region. The independent diffraction region is formed centrally of the diffraction element in the radial direction, and diffracts the incident light so that it can be directed to the independent light-receiving region. The second diffraction region is formed outwardly from the independent diffraction region in the radial direction.

By virtue of the independent diffraction region, the increase and decrease of the quantity of light entering the radial midportion of the diffraction element is independent of that of the push-pull signal. The second diffraction region is located radially outwardly from the independent diffraction region, the edges of which extends in the tangential and radial directions. Thereby, the quantity of light entering the radial midportion of the diffraction element that is relatively large in the intensity of incident light per unit area becomes irrelevant to the light quantity used for push-pull signal calculation. This leads to easiness in determining the shape of the second diffraction region in such a manner that the quantity of incident light is proportional to the amount of deviation of the objective lens from the track.

According to the example embodiment, the light-receiving region receives at least one of + first order diffraction light and − first order diffraction light resulting from diffraction in the diffraction element.

Accordingly, as compared with the case of utilizing zeroth order diffraction light in lieu of ± first order diffraction light, the distance between the diffraction element and the light-receiving element can be made shorter. Although there is a need to secure a sufficient distance between the diffraction element and the light-receiving element to space a plurality of the light-receiving regions apart in the light-receiving element for the sake of positive distinction, by utilizing ± first order diffraction light, it is possible to arrange a plurality of the light-receiving regions spacedly while shortening the distance between the diffraction element and the light-receiving element.

According to the example embodiment, the light-receiving element further includes a focus error detecting region, and the diffraction element further includes a focus-error diffraction region. The focus error detecting region included in the light-receiving element is a region for achieving focus error detection. The focus-error diffraction region included in the diffraction element acts to diffract incident light so that it can be directed to the focus error detecting region.

Thereby, focus error detection and radial error detection can be achieved by the common diffraction element and light-receiving element. Therefore, as compared with the case of disposing one of the diffraction element and the light-receiving element in a separate unit for focus error detection and radial error detection, the optical pickup apparatus can be made more compact.

According to the example embodiment, in response to an output signal from the focus error detecting region, the control-driving section produces a focus error signal by a knife edge method.

In this case, as compared with the case of effecting focus error detection by the differential push pull method, the light-receiving region used for focus error detection can be smaller in size, wherefore the optical pickup apparatus can be made more compact.

According to the example embodiment, in response to an output signal from the focus error detecting region, the control-driving section produces a focus error signal by a beam size method.

In this case, as compared with the case of effecting focus error detection by the differential push pull method for instance, the light-receiving region used for focus error detection can be smaller in size, wherefore the optical pickup apparatus can be made more compact.

According to the example embodiment, the light source, the diffraction element, and the light-receiving element are combined in a single-piece unit.

Accordingly, when mounted in combination with other components, the optical pickup apparatus can be handled with the light source, the diffraction element, and the light-receiving element secured in their relative positions. This leads to easiness in mounting operation.

BRIEF DESCRIPTION OF THE DRAWINGS

Other and further features, and advantages of the example embodiment will be more explicit from the following detailed description taken with reference to the drawings wherein:

FIGS. 5A and 5B are plan views of the light-receiving element and the diffraction element of the optical pickup apparatus in accordance with a second embodiment, as viewed in the optical-axis direction Z;

FIGS. 7A and 7B are plan views of the light-receiving element and the diffraction element of the optical pickup apparatus in accordance with a third embodiment, as viewed in the optical-axis direction Z;

DETAILED DESCRIPTION

Figure 1A:
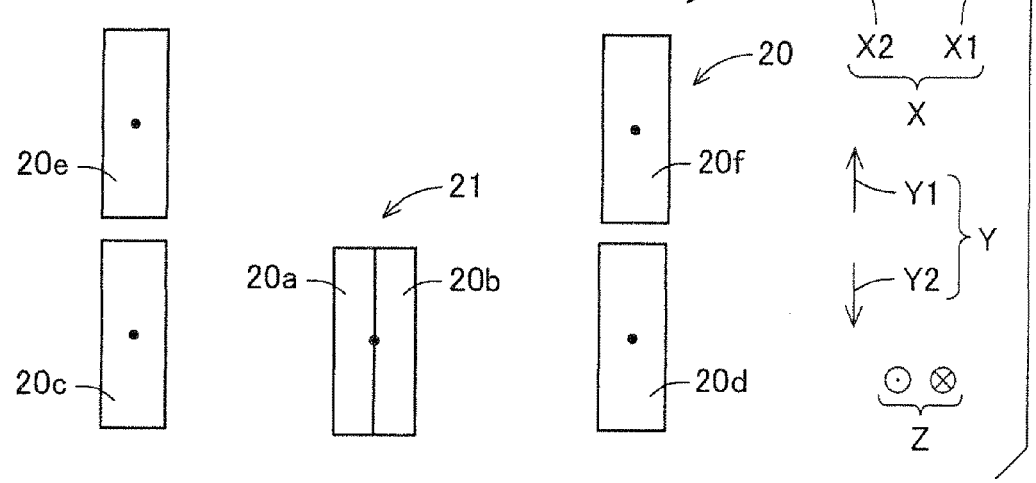
FIGS. 1A and 1B are plan views of a light-receiving element and a diffraction element of an optical pickup apparatus in accordance with a first embodiment, as viewed in a direction of optical axis Z.

Now referring to the drawings, preferred embodiments will be described in detail.

A plurality of embodiments thereof will now be described with reference to the accompanying drawings. In the following description, constituent technologies of an embodiment that play the same or corresponding roles as in the preceding embodiment will be identified with the same reference symbols, and overlapping explanation may be omitted. Where only part of the construction of an embodiment is described, the other part thereof will be regarded as the same as that of the preceding embodiment. Not only it is possible to combine the specifically-described features of different embodiments, but it is also possible to partly combine the different embodiments themselves so long as the combination poses no problem. Moreover, the following embodiments are considered as illustrative only of the technical features presented herein and are not intended to limit the technical scope. Hence, many changes and modifications may be made within the technical scope of the invention as expressed in the appended claims.

First Embodiment

Figure 1B:
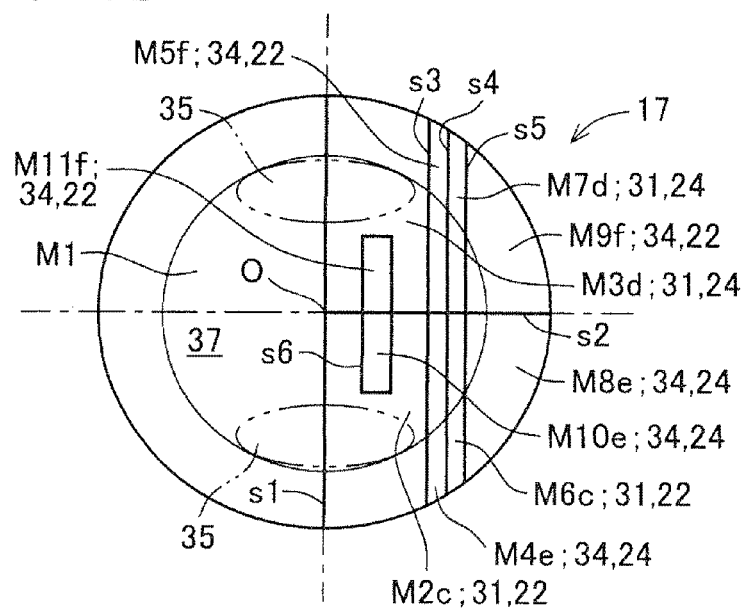
Figure 2:
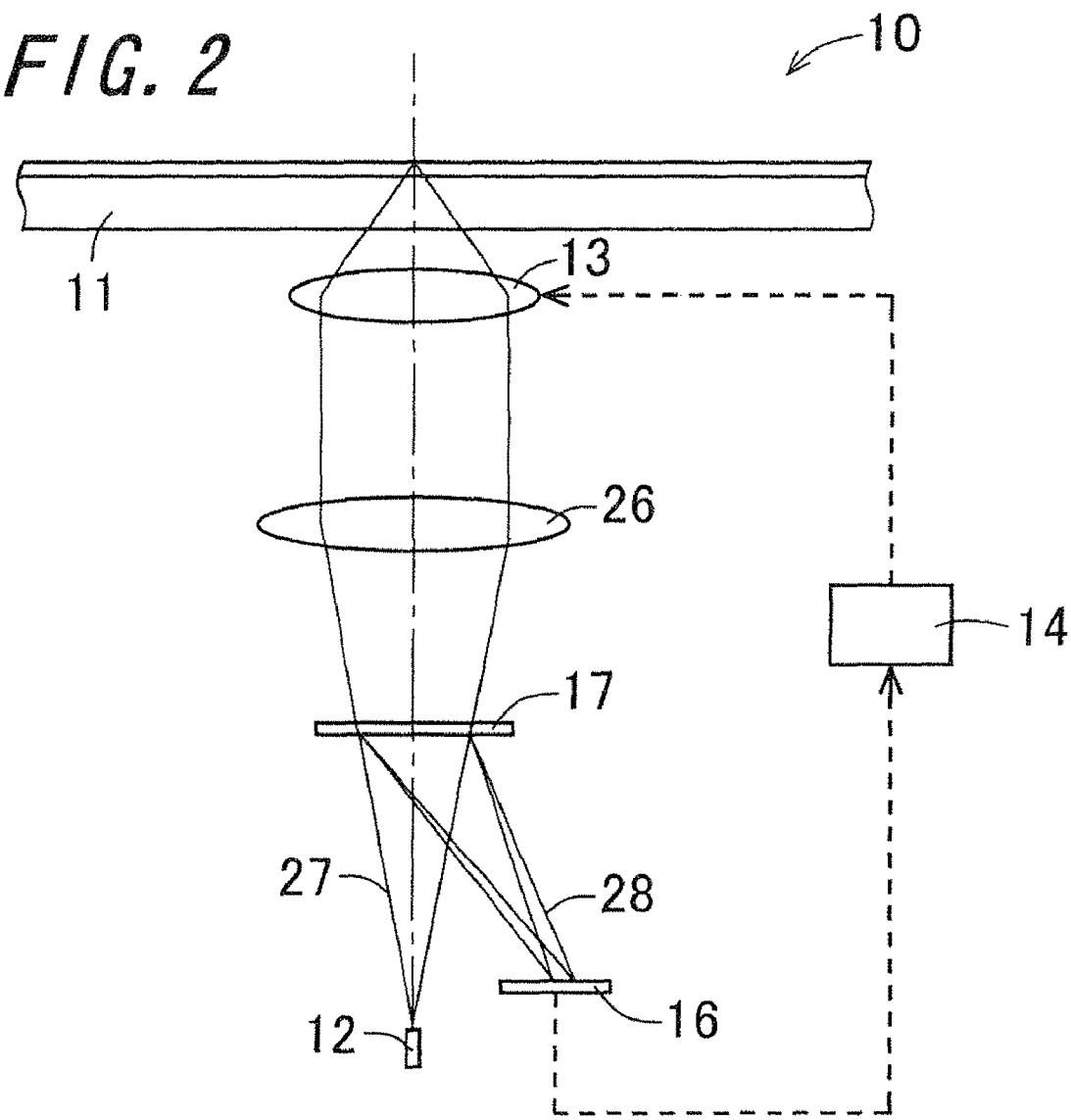
FIG. 2 is a side view showing the structure of the optical pickup apparatus in accordance with the first embodiment.

FIGS. 1A and 1B are plan views of a light-receiving element 16 and a diffraction element 17 of an optical pickup apparatus 10 in accordance with a first embodiment, as viewed in a direction of optical axis Z. FIG. 2 is a side view showing the structure of the optical pickup apparatus 10 in accordance with the first embodiment. The optical pickup apparatus 10 of this embodiment is designed to effect emission and reception of light for an optical recording medium 11 such for example as CD, DVD, and BD, and is thus installed in information processing equipment. The information processing equipment performs at least one of information recording process, information reproducing process, information erasing process, and information rewriting process on the optical recording medium 11.

The optical pickup apparatus 10 includes a light source 12, an objective lens 13, a diffraction element 17, a light-receiving element 16, and a control-driving section 14. The light source 12, which is implemented by using a semiconductor laser element for instance, is mounted in the optical pickup apparatus 10 to effect emission of light for use in information processing to be performed on the optical recording medium 11. The objective lens 13 is a lens for condensing light emitted from the light source 12 on a surface of the optical recording medium 11. A position on the recording surface of the optical recording medium 11 at which the light condensed by the objective lens 13 is admitted will occasionally be termed "light-condensing position".

Light reflected from the optical recording medium 11 enters the diffraction element 17. A light beam diffracted by the diffraction element 17 enters the light-receiving element 16. The light-receiving element 16 includes a plurality of light-receiving regions 20. The light-receiving region 20 produces an output signal responsive to the quantity of the incident light beam. In the optical pickup apparatus 10, the control-driving section 14 is electrically connected between the objective lens 13 and the light-receiving element 16. In the control-driving section 14, differences among the output signals produced by a plurality of the light-receiving regions 20 are obtained by calculation to derive a push-pull signal, and, on the basis of the push-pull signal, the objective lens 13 is driven under control. Thereby, the control-driving section 14 achieves radial error correction.

The control-driving section 14 includes an actuator for driving the objective lens 13. By means of the actuator, focus servo control and radial servo control for the objective lens 13 can be achieved. To be specific, the actuator exercises focus servo control so as for forward light that passed through the objective lens 13 to be condensed on the recording surface of the optical recording medium 11, and also exercises radial servo control for the objective lens 13, so that the forward light that has been condensed after passing through the objective lens 13 is caused to follow a predetermined track.

The forward light 27 emitted from the light source 12 is reflected from the optical recording medium 11 and whereafter reaches the diffraction element 17 as reflected backward light 28. The diffraction element 17 is shaped as substantially a flat and disc plate. The light reflected from the optical recording medium 11 is directed approximately perpendicularly to the diffraction element 17.

The diffraction element 17 includes a forward region 22 and a reverse region 24. The forward region 22 serves to let a light beam enter, of a plurality of the light-receiving regions 20, the one for producing an output signal which bears a same-sign relation to the push-pull signal. The reverse region 24 serves to let a light beam enter, of a plurality of the light-receiving regions 20, the one for producing an output signal which bears an opposite-sign relation to the push-pull signal. A plurality of the forward regions 22 and the reverse regions 24 are arranged alternately in one of the directions set for the diffraction element 17. To be specific, a plurality of the forward regions 22 and the reverse regions 24 are arranged alternately in one of the directions extending at an angle with respect to a radial direction Y perpendicular to a tangential direction X set for the diffraction element 17. In this embodiment in particular, a plurality of the forward regions 22 and the reverse regions 24 are arranged alternately in the tangential direction X of the diffraction element 17. In this embodiment, of the directions parallel to the diffraction element 17, the direction of a line tangent to the track at the light-condensing position on the surface of the optical recording medium 11 is termed "tangential direction (tangential(ly))" X, and the direction parallel to the diffraction element 17 and perpendicular to the tangential direction X is termed "radial direction (radial(ly))" Y.

At least one of + first order diffraction light and − first order diffraction light resulting from diffraction in the diffraction element 17 enters the light-receiving region 20. Moreover, the light-receiving element 16 includes a focus error detecting region 21, and the diffraction element 17 includes a focus-error diffraction region. The focus error detecting region 21 included in the light-receiving element 16 is a region for achieving focus error detection. The focus-error diffraction region included in the diffraction element 17 acts to diffract the incident light so that it can be directed to the focus error detecting region 21. In response to an output signal from the focus error detecting region 21, the control-driving section 14 produces a focus error signal by the knife edge method. The light source 12, the diffraction element 17, and the light-receiving element 16 are combined in a single-piece unit.

The optical pickup apparatus 10 further includes a collimator lens 26 which is a lens for turning the light emitted from the light source 12 into parallel light and allowing it to pass therethrough toward the optical recording medium 11. The light emitted from the light source 12 passes through the collimator lens 26 and is whereafter condensed on the recording surface of the optical recording medium 11 by the objective lens 13. The recording surface of the optical recording medium 11 is one of the surfaces thereof on which is recorded information. Light that follows a path from the light source 12, from which it is emitted, to the recording surface of the optical recording medium 11 is termed "the forward light" 27. Light that follows a path from the recording surface of the optical recording medium 11, from which it is reflected, onwards is termed "the reflected backward light" 28. Upon reaching the light-receiving element 16, the reflected backward light 28 is changed in state from light to, e.g. an electric signal or energy such as heat.

The reflected backward light 28 reflected from the recording surface of the optical recording medium 11 passes through the objective lens 13, is diffracted by the diffraction element 17, and enters the light-receiving element 16. The optical pickup apparatus 10 may include a polarizing element such as a λ/4 wavelength plate and a λ/2 wavelength plate, as well as a beam splitter. In this case, the optical pickup apparatus 10 may be so designed that at least one of the forward light 27 and the backward light passes through such an optical component.

In the optical pickup apparatus 10 of the present embodiment as shown in FIG. 2, after passing through the objective lens 13, the reflected backward light 28 passes through the collimator lens 26 and then enters the diffraction element 17. The optical pickup apparatus 10 is provided with a focusing servomechanism and an actuator (neither of them is represented graphically) for driving the objective lens 13. Thereby the objective lens 13 is positionally adjusted so that its position relative to the optical recording medium 11 can be controlled properly. In the optical pickup apparatus 10 of the present embodiment shown in FIG. 2, at least the light source 12, the diffraction element 17, the collimator lens 26, and the objective lens 13 are arranged on an optical axis. The diffraction element 17 is disposed substantially in parallel with the optical recording medium 11. The reflected backward light 28 travels along the optical axis to enter the diffraction element 17, and is then directed, in offset from the optical axis, to the light-receiving element 16.

The optical axis is perpendicular to the optical recording medium 11 as well as the diffraction element 17. The direction in which the optical axis extends is termed "the optical-axis direction" Z. The direction of a line tangent to, of the tracks of the optical recording medium 11, the one located at a position irradiated with the forward light 27 is the tangential direction X. A light beam entering the diffraction element 17 imparts a change in tangential X attitude of the optical recording medium 11 to the diffraction element 17. That is, the tangential X position of the optical recording medium 11 defines the position of the diffraction element 17. In the present embodiment, the tangential direction X of the recording surface of the optical recording medium 11 and a direction of the diffraction element 17 corresponding to the tangential direction X of the recording surface of the optical recording medium 11 coincide with each other.

A direction perpendicular to the tangential direction X as well as the optical-axis direction Z is the radial direction Y. For example, given the optical recording medium 11 of a CD, then the radial direction Y refers to the direction of the radius of the CD with respect to its center of rotation. In the present embodiment, the direction radially of the recording surface of the optical recording medium 11 and the direction of the diffraction element 17 corresponding to the radial direction Y of the recording surface of the optical recording medium 11 coincide with each other.

In FIG. 1A, there is shown a plan view of the light-receiving element 16 as viewed in the optical-axis direction Z. In FIG. 1B, there is shown a plan view of the diffraction element 17 as viewed from the optical recording medium 11 in the optical-axis direction Z. The light-receiving element 16 includes six light-receiving regions 20, namely the first to sixth light-receiving regions 20a, 20b, 20c, 20d, 20e, and 20f. The light-receiving regions 20, of which each is implemented by using an element capable of effecting photoelectric conversion such as a photodiode, produce output signals responsive to the quantity of incident light. To be specific, the light-receiving region 20 produces output of the quantity of light it receives per unit of time in the form of voltage. The output signal produced by each of the light-receiving regions 20 is inputted to the control-driving section 14 to be used as information for focus error correction and radial error correction. Some embodiments may be so designed that the output signal from the light-receiving region 20 is inputted to the control-driving section 14 by way of a photomultiplier tube or the like.

As shown in FIG. 1B, the diffraction element 17 of the first embodiment is circular in shape as viewed in the optical-axis direction Z, and is divided into a plurality of diffraction regions by a plurality of dividing lines. Out of the dividing lines, the first dividing line s1 extends in the radial direction Y while passing through the center O of a circle representing the contour of the diffraction element 17 to define the diameter of the circle. The second dividing line s2 extends from the center O in one of the tangential directions, which is termed one tangential direction X1, but does not extend from the center O in the other of the tangential directions, which is termed the other tangential direction X2. The second dividing line s2 is, at its one tangential direction X1-side end, intersected by the circle representing the contour of the diffraction element 17.

As shown in FIG. 1B, in the diffraction element 17 as viewed from the optical recording medium 11 in the optical-axis direction 1, given that the extending direction of the first dividing line s1, or the radial direction Y is a top-bottom direction and that the extending direction of the second dividing line s2, or one tangential direction X1 is a right-hand direction, then the radial direction comprises two opposite directions, namely "one radial direction" Y1 which is an upward direction and "the other radial direction" Y2 which is a downward direction.

The third dividing line s3 is a chord extending in the radial direction Y, and it and the second dividing line s2 cross at right angles at a point spaced a distance of approximately half the radius of the circle away from the center O in one tangential direction X1. The fourth dividing line s4 is spaced only a short distance away from the third dividing line s3 in one tangential direction X1 and disposed in parallel with the third dividing line s3. In other words, the fourth dividing line s4 is a chord which is parallel to the third dividing line s3, is spaced away from the center O in the same direction as is the third dividing line s3, and is located outward beyond the third dividing line s3.

The fifth dividing line s5 is a chord spaced away from the fourth dividing line s4 in one tangential direction X1 and disposed in parallel with the fourth dividing line s4. Each of the third to fifth dividing lines s3, s4, and s5 is, at its lengthwise midpoint (radial Y midpoint), intersected perpendicularly by the second dividing line s2. The sixth dividing line s6 are formed between the first dividing line s1 and the third dividing line s3 as if to cut out a rectangular region. That is, the sixth dividing line s6 has the shape of a rectangle whose longer edges extend in the radial direction Y, and the rectangle extends radially Y over two regions on opposite sides of the second dividing line s2. The second dividing line s2 crosses the radial Y midpoint of the rectangle formed by the sixth dividing line s6 so as to divide the rectangle into two regions. The rectangle is disposed at a position lying substantially centrally between the first dividing line s1 and the third dividing line s3 in the tangential direction X.

In the diffraction element 17, the diffraction region M1 lying on the other-tangential-direction-X2 side thereof with respect to the first dividing line s1 corresponds to the first light-receiving region 20a and the second light-receiving region 20b. That is, the reflected backward light 28 diffracted in the region M1 is caused to take a traveling path toward the first and second light-receiving regions 20a and 20b through diffraction to enter the first and second light-receiving regions 20a and 20b.

The diffraction region M2c which lies on the one-tangential-direction-X1 side of the diffraction element with respect to the first dividing line s1, lies on the other-radial-direction-Y2 side with respect to the second dividing line s2, lies on the other-tangential-direction-X2 side with respect to the third dividing line s3, and lies outside the sixth dividing line s6 corresponds to the third light-receiving region 20c. The diffraction region M3d which lies on the one-tangential-direction-X1 side with respect to the first dividing line s1, lies on the one-radial-direction-Y1 side with respect to the second dividing line s2, lies on the other-tangential-direction-X2 side with respect to the third dividing line s3, and lies outside the sixth dividing line s6 corresponds to the fourth light-receiving region 20d.

The diffraction region M4e which lies on the one-tangential-direction-X1 side with respect to the third dividing line s3, lies on the other-tangential-direction-X2 side with respect to the fourth dividing line s4, and lies on the other-radial-direction-Y2 side with respect to the second dividing line s2 corresponds to the fifth light-receiving region 20e. The diffraction region M5f which lies on the one-tangential-direction-X1 side with respect to the third dividing line s3, lies on the other-tangential-direction-X2 side with respect to the fourth dividing line s4, and lies on the one-radial-direction-Y1 side with respect to the second dividing line s2 corresponds to the sixth light-receiving region 20f.

The diffraction region M6c which lies on the one-tangential-direction-X1 side with respect to the fourth dividing line s4, lies on the other-tangential-direction-X2 side with respect to the fifth dividing line s5, and lies on the other-radial-direction-Y2 side with respect to the second dividing line s2 corresponds to the third light-receiving region 20c. The diffraction region M7d which lies on the one-tangential-direction-X1 side with respect to the fourth dividing line s4, lies on the other-tangential-direction-X2 side with respect to the fifth dividing line s5, and lies on the one-radial-direction-Y1 side with respect to the second dividing line s2 corresponds to the fourth light-receiving region 20d.

The diffraction region M8e which lies on the one-tangential-direction-X1 side with respect to the fifth dividing line s5 and lies on the other-radial-direction-Y2 side with respect to the second dividing line s2 corresponds to the fifth light-receiving region 20e. The diffraction region M9f which lies on the one-tangential-direction-X1 side with respect to the fifth dividing line s5 and lies on the one-radial-direction-Y1 side with respect to the second dividing line s2 corresponds to the sixth light-receiving region 20f.

Out of the diffraction regions located inside the sixth dividing line s6, the diffraction region M10e lying on the other-radial-direction-Y2 side with respect to the second dividing line s2 corresponds to the fifth light-receiving region 20e. Out of the diffraction regions located inside the sixth dividing line s6, the diffraction region M11f lying on the one-radial-direction-Y1 side with respect to the second dividing line s2 corresponds to the sixth light-receiving region 20f.

The diffraction element 17 includes a bright-dark contrast area 35 and a simple area 37. The bright-dark contrast area 35 is an area where, out of the light beams reflected from the optical recording medium 11, diffraction reflected light from the track borne on the surface of the optical recording medium 11 enters. The simple area 37 is an area where, out of the light beams reflected from the optical recording medium 11, only simple reflected light from the optical recording medium 11 enters; that is, no diffraction reflected light enters. The light-receiving region 20 includes a push-pull light-receiving region and an offset light-receiving region. Moreover, the diffraction element 17 includes a first diffraction region 31 and a second diffraction region 34. The first diffraction region 31 diffracts the incident light so that it can be directed to the push-pull light-receiving region. The second diffraction region 34 diffracts the incident light so that it can be directed to the offset light-receiving region. A plurality of the first diffraction regions 31 and the second diffraction regions 34 are arranged alternately in one of the directions set for the diffraction element 17.

The reflected backward light 28 resulting from reflection at the optical recording medium 11 enters the diffraction element 17 in the form of a light beam having a circular sectional profile smaller than that of the diffraction element 17. In the diffraction element 17, the region which is irradiated with a beam of the reflected backward light 28, in other words, the range of projection of a beam of the reflected backward light 28 on the diffraction element 17 includes, in addition to the rectangular diffraction region formed by the sixth dividing line s6, part of the diffraction region lying on the one-tangential-direction-X1 side with respect to the fifth dividing line s5. Where the region which is irradiated with a beam of the reflected backward light 28 is termed "irradiated area", then the irradiated area has the shape of a circle whose center coincides with the center O of the circle representing the contour of diffraction element 17. The radius of the irradiated area is set to be greater than the distance between the first dividing line s1 and the fifth dividing line s5 spaced apart in the tangential direction X1.

In the irradiated area, located in each of its extreme one-radial-direction-Y1 position and extreme the other-radial-direction-Y2 position is an area which exhibits a significant luminance variation when the forward light 27 entering the optical recording medium 11 travels radially across the track. This area is termed "bright-dark contrast area" 35, and there are formed two bright-dark contrast areas 35 spaced apart in the radial direction Y. The bright-dark contrast areas 35 are each substantially elliptical in shape. The bright-dark contrast area 35 refers to that part of the irradiated area which undergoes the most significant variation in light quantity per unit area when a radial error is caused by the radial displacement of the objective lens 13.

The reflected backward light 28 entering the diffraction element 17 comprises simple reflected light and diffraction reflected light. The simple reflected light enters the entire circular irradiated area on the diffraction element 17. On the other hand, the diffraction reflected light enters the bright-dark contrast areas 35 spaced apart in the radial direction Y. Where the region of the irradiated area excluding the bright-dark contrast areas 35 is termed "simple area", then no diffraction reflected light enters the simple area. Therefore, when the forward light which passed through the objective lens 13 travels across the track borne on the recording surface of the optical recording medium 11, as compared with the bright-dark contrast area 35 which exhibits a significant light-intensity change at this time, the simple area undergoes a lesser degree of change in the quantity of incident light.

In FIG. 1B, the bright-dark contrast area 35 is encircled by a chain double-dashed line. In other regions of the irradiated area than the bright-dark contrast area 35, even if the forward light 27 travels radially across the track, the degree of change in light quantity per unit area, or a change in light intensity is small compared to the bright-dark contrast area 35. Accordingly, by exploiting a difference in light quantity between a light beam entering the region which changes greatly in light intensity and a light beam entering the region which changes little in light intensity, it is possible to produce a push-pull signal. In the case of driving the objective lens 13 under control in response to the push-pull signal thereby produced, the radial displacement of the forward light 27 entering the optical recording medium 11, or a radial error can be corrected.

Out of the two bright-dark contrast areas 35, the one radial direction Y1-side bright-dark contrast area 35 extends over two regions on opposite sides of the first dividing line s1, namely the region lying on the other-tangential-direction-X2 side with respect to the first dividing line s1 and the region which lies on the one-tangential-direction-X1 side with respect to the first dividing line s1, lies on the one-radial-direction-Y1 side with respect to the second dividing line s2, lies on the other tangential direction X2-side with respect to the third dividing line s3, and lies outside the sixth dividing line s6. Accordingly, approximately half the one radial direction Y1-side bright-dark contrast area 35 corresponds to the first and second light-receiving regions 20a and 20b, and approximately the other half corresponds to the fourth light-receiving region 20d.

Out of the two bright-dark contrast areas 35, the other radial direction Y2-side bright-dark contrast area 35 extends over two regions on opposite sides of the first dividing line s1, namely the region lying on the other-tangential-direction-X2 side with respect to the first dividing line s1 and the region which lies on the one-tangential-direction-X1 side with respect to the first dividing line s1, lies on the other-radial direction-Y2 side with respect to the second dividing line s2, lies on the other tangential direction X2-side with respect to the third dividing line s3, and lies outside the sixth dividing line s6. Accordingly, approximately half the other radial direction Y2-side bright-dark contrast area 35 corresponds to the first and second light-receiving regions 20a and 20b, and approximately the other half corresponds to the third light-receiving region 20c. As employed herein, "extending over two regions" means that a light beam or shade passes across the boundary between two regions or extends over different regions so as to enter or be projected on both of the two regions.

In the present embodiment, radial error correction is achieved by using the differential push pull (DPP for short) method. Where the strength of an output signal obtained by the differential push pull method is represented as DPP, the strength of a signal from the first light-receiving region 20a is A, the strength of a signal from the second light-receiving region 20b is B, the strength of a signal from the third light-receiving region 20c is C, the strength of a signal from the fourth light-receiving region 20d is D, the strength of a signal from the fifth light-receiving region 20e is E, and the strength of a signal from the sixth light-receiving region 20f is F, then the push-pull signal DPP is expressed by the following formula (2):

$$DPP = (C - D) - k \times (E - F) \quad (2)$$
$$= MPP - k \times SPP$$

Each term of the formula (2) takes on a scalar value. In the formula (2), MPP equates to (C−D) and SPP equates to (E−F). Since the first and second light-receiving regions 20a and 20b of the light-receiving element 16 are utilized for focus error correction, it follows that neither the signal strength A nor the signal strength B is found in the formula (2) for push-pull signal calculation. In the present embodiment, the push-pull signal for radial error correction is obtained on the basis of an output signal corresponding to the diffraction region lying on the one-tangential-direction-X1 side of the diffraction element with respect to the first dividing line s1. In the formula, the term related to C and D implying the signal strength from the bright-dark contrast area 35 is defined as MPP, whereas the term related to E and F irrelevant to the signal strength from the bright-dark contrast area 35 is defined as SPP.

The third and fourth light-receiving regions 20c and 20d for producing output of C and D related to MPP receive light from the bright-dark contrast area 35. That is, the diffraction reflected light of the reflected backward light 28 enters the third and fourth light-receiving region 20c and 20d. Since the diffraction reflected light is explicit in the push-pull signal, the third and fourth light-receiving regions 20c and 20d for producing output of C and D are each termed "push-pull light-receiving region". By contrast, the fifth and sixth light-receiving regions 20e and 20f for producing output of E and F, while receiving light from the simple area, are free of incidence of light from the bright-dark contrast area 35. That is, the fifth, sixth light-receiving region 20e, 20f, while receiving the simple reflected light, is free of incidence of the diffraction reflected light. The quantity of light entering the fifth, sixth light-receiving region 20e, 20f is roughly proportional to the amount of displacement of the objective lens 13 relative to the track, or offset amount, wherefore the fifth, sixth light-receiving region 20e, 20f is termed "offset light-receiving region".

Since the output signals C and D from the third and fourth light-receiving regions 20c and 20d imply the quantity of the light beam diffracted in the bright-dark contrast area 35, it is possible to obtain a push-pull output signal of AC component. The output signals E and F from the fifth and sixth light-receiving regions 20e and 20f are caused to vary when the irradiated area on the diffraction element 17 is shifted from the center O of the diffraction element 17 due to the displacement of the objective lens 13 under the control of the control-driving section 14. The variation in signal strength of E and F is less significant compared to the ratio of variation in C and D to the change of radial-error magnitude.

In the terms of the formula (2), C and F bear a same-sign relation to the push-pull signal DPP. In other words, as C and F are increased, the value of the DPP is increased correspondingly. C and F are the same in polarity, which is termed "equality in polarity". On the other hand, D and E bear an opposite-sign relation to the push-pull signal DPP. In other words, as D and E are increased, the value of the DPP is decreased conversely. There is equality in polarity between D and E. Similarly, there is equality in polarity between the third light-receiving region 20c and the sixth light-receiving region 20f for producing output of C and F, and there is equality in polarity between the fourth light-receiving region 20d and the fifth light-receiving region 20e for producing output of D and E.

The diffraction region corresponding to C and F, found in the terms of the formula (2), bearing a same-sign relation to the push-pull signal DPP is termed "forward region" 22. By contrast, the diffraction region corresponding to D and E, found in the terms of the formula (2), bearing an opposite-sign relation to the push-pull signal DPP is termed "reverse region" 24.

Given that the diffraction region on the diffraction element 17 which corresponds to, of the light-receiving regions 20, the push-pull light-receiving region is the first diffraction regions 31, whereas the diffraction region on the diffraction element 17 which corresponds to the offset light-receiving region is the second diffraction region 34, then, since the third light-receiving region 20c is the push-pull light-receiving region, the diffraction region M2c and the diffraction region M6c on the diffraction element 17 corresponding to the third light-receiving region 20c are the first diffraction regions 71. Likewise, since the fourth light-receiving region 20d is the push-pull light-receiving region, the diffraction region M3d and the diffraction region M7d on the diffraction element 17 corresponding to the fourth light-receiving region 20d are the first diffraction regions 31. On the other hand, since the fifth light-receiving region 20e is the offset light-receiving region, the diffraction region M4e, the diffraction region M8e, and the diffraction region M10e on the diffraction element 17 corresponding to the fifth light-receiving region 20e are the second diffraction regions 34. Likewise, since the sixth light-receiving region 20f is the offset light-receiving region, the diffraction region M5f, the diffraction region M9f, and the diffraction region M11f on the diffraction element 17 corresponding to the sixth light-receiving region 20f are the second diffraction regions 34.

As well as being the first diffraction regions 31, the diffraction region M2c and the diffraction region M6c on the diffraction element 17 are also the forward regions 22. As well as being the first diffraction regions 31, the diffraction region M3d and the diffraction region M7d on the diffraction element 17 are also the reverse regions 24. As well as being the second diffraction regions 34, the diffraction region M4e, the diffraction region M8e, and the diffraction region M10e on the diffraction element 17 are also the reverse regions 24. As well as being the second diffraction regions 34, the diffraction region M5f, the diffraction region M9f, and the diffraction region M11f on the diffraction element 17 are also the forward regions 22.

In the diffraction element 17, for example, where the diffraction regions formed on the one-radial-direction-Y1 side with respect to the second dividing line s2 and in the vicinity of the second dividing line s2 are concerned, when viewed in one tangential direction X1-to-the other tangential direction order, the diffraction region corresponding to the sixth light-receiving region 20f for producing the output signal F and the diffraction region corresponding to the fourth light-receiving region 20d for producing the output signal D are alternately arranged. Since the diffraction region corresponding to the sixth light-receiving region 20f outputting the output signal F is the forward region 22, whereas the diffraction region corresponding to the fourth light-receiving region 20d outputting the output signal D is the reverse region 24, it follows that, on the one-radial-direction-Y1 side with respect to the second dividing line s2, a plurality of the forward regions 22 and the reverse regions 24 are arranged alternately in the tangential direction X.

Moreover, since the diffraction region corresponding to the sixth light-receiving region 20f outputting the output signal F is the second diffraction region 34, whereas the diffraction region corresponding to the fourth light-receiving region 20d outputting the output signal D is the first diffraction region 31, it follows that, on the one-radial-direction-Y1 side with respect to the second dividing line s2, a plurality of the first diffraction regions 31 and the second diffraction regions 34 are arranged alternately in the tangential direction X. Since diffraction light from the bright-dark contrast area 35 enters the first diffraction region 31, the diffraction reflected light enters the push-pull light-receiving region corresponding to the first diffraction region 31. On the other hand, since the diffraction light from the bright-dark contrast area 35 does not enter the second diffraction region 34, the offset light-receiving region corresponding to the second diffraction region 34 receives only the simple reflected light.

Figure 3:
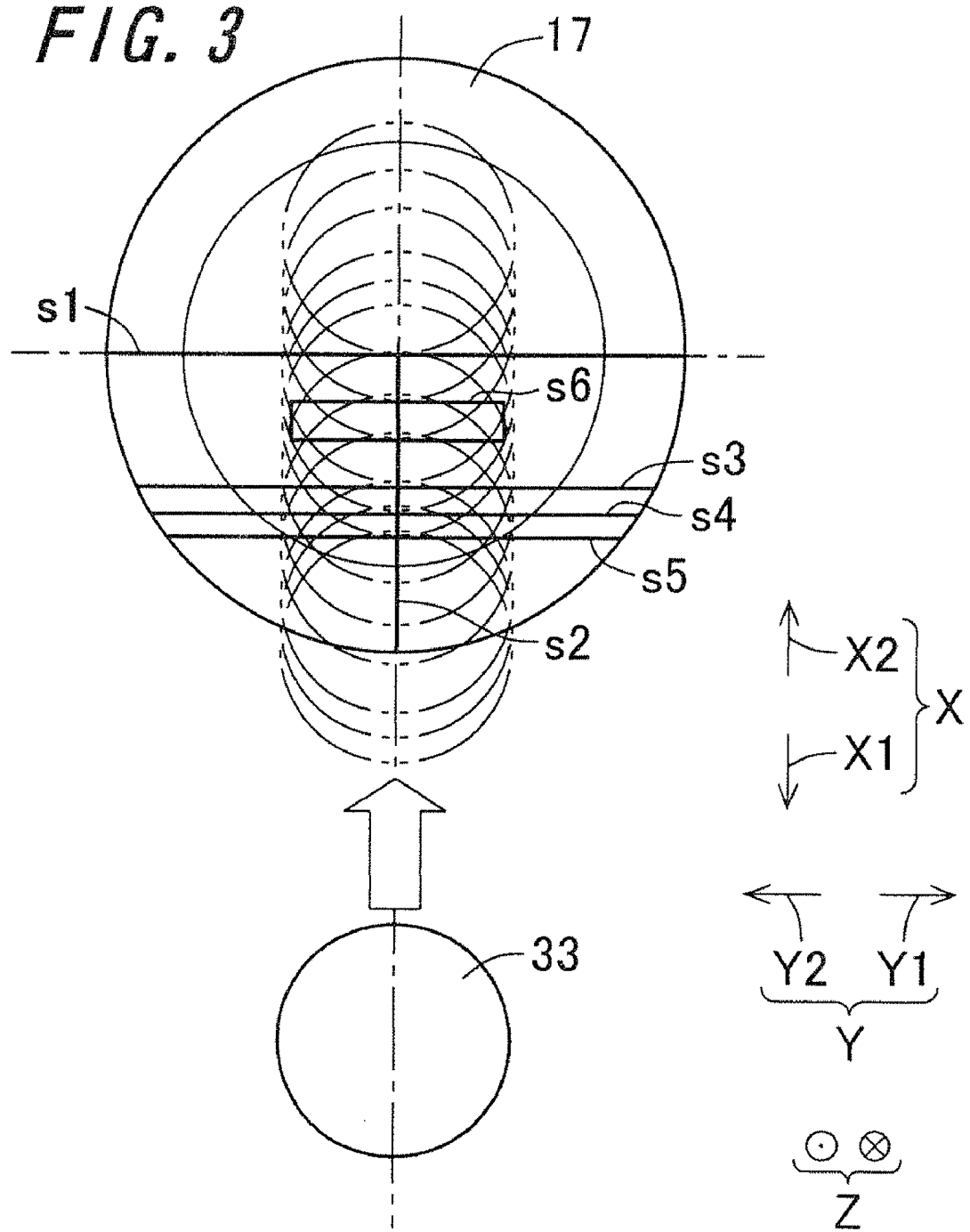
FIG. 3 is a plan view of the diffraction element of the first embodiment and a foreign-matter shade projected thereon, as viewed in the optical-axis direction Z.

FIG. 3 is a plan view of the diffraction element 17 of the first embodiment of the invention and a foreign-matter shade 33 projected thereon, as viewed in the optical-axis direction Z. In FIG. 3, there is shown how the foreign-matter shade 33 moves from the one-tangential-direction-X1 side to the other-tangential-direction side of the diffraction element 17. The foreign-matter shade 33 is illustrated as having the shape of a circle whose diameter is substantially equal to the distance between the first dividing line s1 and the fifth dividing line s5.

In the diffraction element 17, for example, where the diffraction regions formed on the other-radial-direction-Y2 side with respect to the second dividing line s2 and in the vicinity of the second dividing line s2 are concerned, when viewed in one tangential direction X1-to-the other tangential direction order, the diffraction region corresponding to the fifth light-receiving region 20e outputting the output signal E and the diffraction region corresponding to the third light-receiving region 20c for outputting the output signal C are alternately arranged. Since the diffraction region corresponding to the third light-receiving region 20c outputting the output signal C is the forward region 22, whereas the diffraction region corresponding to the fifth light-receiving region 20e outputting the output signal E is the reverse region 24, it follows that, on the other-radial-direction-Y2 side with respect to the second dividing line s2, a plurality of the forward regions 22 and the reverse regions 24 are arranged alternately in the tangential direction X.

By implementing formation of a plurality of the diffraction regions in the diffraction element 17 and calculation of output signals that are produced responsive to the quantity of light entering the individual diffraction regions in the manner thus far described, when the shade 33 of a foreign matter adherent onto the track of the optical recording medium 11 is projected on the diffraction element 17, it is possible to increase the possibility that it is projected on the forward region 22 and the reverse region 24 at the same time. Even if the foreign-matter shade 33 enters the forward region 22 and the reverse region 24 at different timings, by virtue of the alternate arrangement of a plurality of the forward regions 22 and the reverse regions 24, the values indicative of timewise difference can be averaged in the performance of output-signal calculation. Accordingly, signal fluctuation corresponding to the forward region 22 and signal fluctuation corresponding to the reverse region 24 can be synchronized with each other and cancel each other out.

Figure 4A:
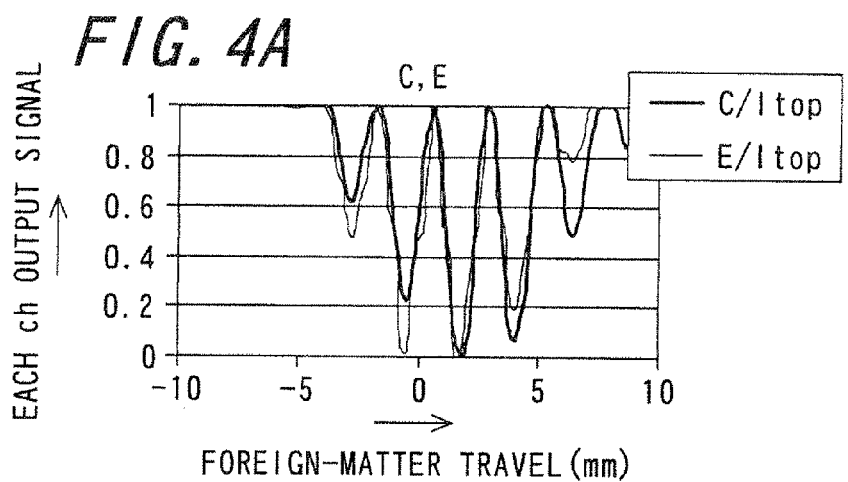
FIGS. 4A to 4C are diagrams showing variation in the strengths of signals from the light-receiving regions and in the push-pull signal DPP entailed by the movement of the foreign-matter shade on the diffraction element as observed in the first embodiment.
Figure 4B:
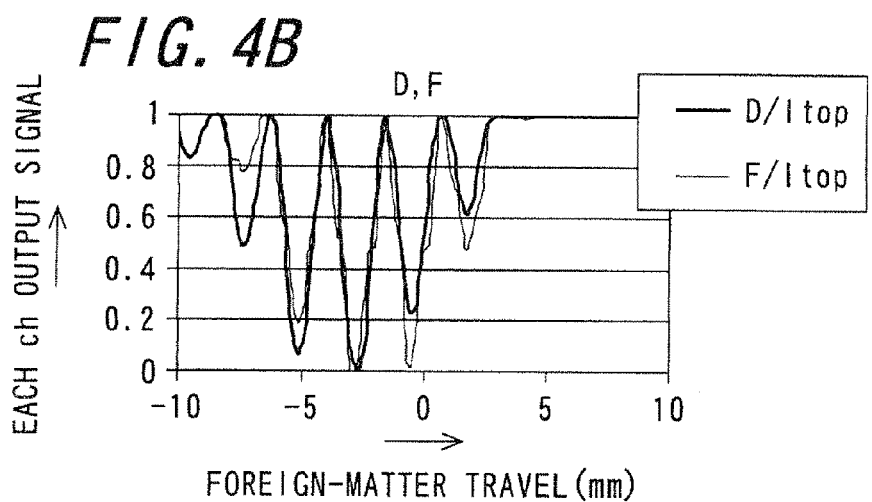
Figure 4C:
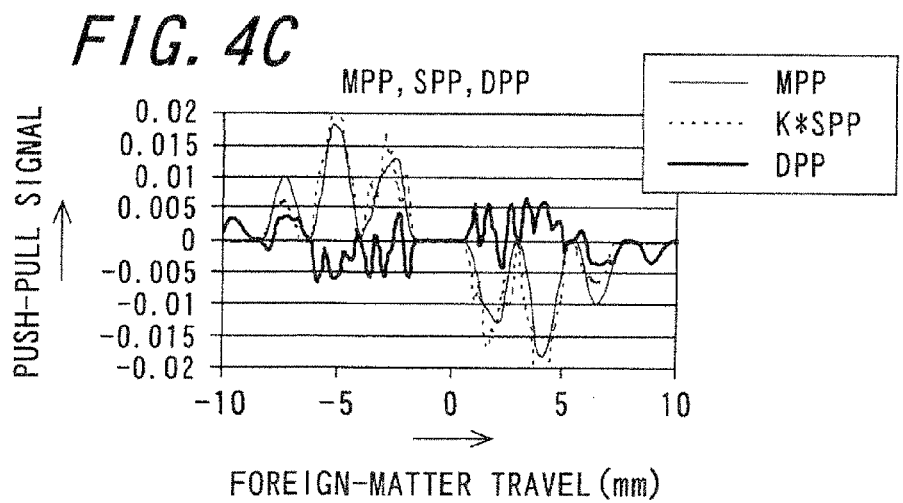

FIGS. 4A to 4C are diagrams showing variation in the strengths of signals from the light-receiving regions 20 and in the push-pull signal DPP entailed by the movement of the foreign-matter shade 33 on the diffraction element 17 as observed in the first embodiment of the invention. Indicated in FIG. 4A are the output signals C and E, and indicated in FIG. 4B are the output signals B and F. In FIGS. 4A to 4C, the abscissa represents the tangential X position of the foreign matter. The position at which the center of the foreign matter coincides with the center O of the diffraction element 17 is set at zero. Moreover, the ordinate represents signal strength. The output signal C corresponds to the forward region 22, and the output signal E corresponds to the reverse region 24.

As shown in FIG. 4A, the output signals C and E, while fluctuating with the movement of the foreign matter, are successfully synchronized with each other. Thereby, even if the foreign-matter shade 33 moves on the other-radial-direction-Y2 side of the diffraction element 17 with respect to the second dividing line s2, the fluctuation of the output signal C and that of the output signal E cancel each other out, in consequence whereof there results little influence on the push-pull signal DPP. Such a condition is illustrated in FIG. 4C. In FIG. 4C, although the value of MPP and the value of k×SPP vary with the movement of the foreign matter, there is little fluctuation in the push-pull signal DPP produced as the result of calculation.

Out of the light beams entering the bright-dark contrast area 35 formed in correspondence with the first to fourth light-receiving regions 20a, 20b, 20c, and 20d, the one that reaches the diffraction region lying on the other-radial direction-Y2 side with respect to the second dividing line s2 does not enter the reverse region 24 but enters the forward region 22. On the other hand, of the light beams entering the bright-dark contrast area 35, the one that reaches the diffraction region lying on the one-radial-direction-Y1 side with respect to the second dividing line s2 does not enter the forward region 22 but enters the reverse region 24. Accordingly, when a radial error arises with consequent radial Y disproportion in light quantity, the light-quantity disproportion is not balanced out, wherefore there is no problem in effecting radial error correction.

Considering particularly a case where the influence of the foreign-matter shade 33 is exerted not upon the one-radial-direction-Y1 side with respect to the second dividing line s2 but upon the other-radial-direction-Y2 side with respect to the second dividing line s2, since the influence of the foreign-matter shade 33 on the output signal C is also exerted upon the output signal E, it follows that mutual cancellation occurs between the forward region 22 corresponding to the output signal C and the reverse region 24 corresponding to the output signal E in respect of the influence of the foreign-matter shade 33. The foreign-matter shade 33 affects the first diffraction region 31 for effecting incidence of light on the push-pull light-receiving region, and the amount of deviation of the forward light that passed through the objective lens 13 from the track affects, of the output signals C and D, only the output signal C. On the other hand, the foreign-matter shade 33 affects the second diffraction region 34 for effecting incidence of light on the offset light-receiving region, and the amount of deviation of the forward light that passed through the objective lens 13 from the track affects, of the output signals E and F, only the output signal E. Then, the influence of the foreign matter on the output signal C is cancelled by the output signal F.

If, on the other-radial-direction-Y2 side with respect to the second dividing line s2, a plurality of the regions acting as the first diffraction region 31 and the forward region 22 and corresponding to the output signal C and the regions acting as the second diffraction region 34 and the forward region 22 and corresponding to the output signal F are arranged alternately in the tangential direction, as will be understood from the formula (2), cancellation of the influences of the foreign-matter shade 33 cannot be achieved.

The value of the push-pull signal DPP calculated in accordance with the formula (2) is inputted to the control-driving section 14. In response to the push-pull signal DPP, the control-driving section 14 drives the objective lens 13 under its control. In this way, the objective lens 13 is driven to undergo displacement with adjustment in the radial direction Y so as to achieve radial error correction.

The light-receiving element 16 further includes the focus error detecting region 21 for focus error detection, and the diffraction element 17 further includes the focus-error diffraction region for diffracting the incident light so that it can be directed to the focus error detecting region 21. In the first embodiment, the focus error detecting region 21 corresponds to the first and second light-receiving regions 20a and 20b. The focus-error diffraction region acts to diffract the light that reached the diffraction element 17 so that it can be directed to the first and second light-receiving regions 20a and 20b. That is, the focus-error diffraction region corresponds to the diffraction region M1 lying on the other-tangential-direction-X2 side with respect to the first dividing line s1.

Focus error correction is achieved by using the signals A and B from the first and second light-receiving regions 20a and 20b. The first and second light-receiving regions 20a and 20b are adjacent to each other in the light-receiving element 16. A focus error signal FES is calculated in accordance with the following formula (3):

$$FES = A - B \tag{3}$$

By means of the knife edge method, focus error correction is carried out by using a knife edge, with the first dividing line s1 of the diffraction element 17 considered to be a borderline.

A reproduction signal RF is calculated in accordance with the following formula (4):

$$RF = A + B + C + D + E + F \tag{4}$$

Since radial error correction can be achieved with high efficiency and high accuracy, it is possible to stabilize the reproduction signal RF.

According to the first embodiment, the diffraction element 17 includes the forward region 22 and the reverse region 24. The forward region 22 serves to let the reflected backward light 28 enter, of the light-receiving regions 20, the one which produces an output signal bearing a same-sign relation to the push-pull signal. The reverse region 24 serves to let the reflected backward light 28 enter, of the light-receiving regions 20, the one which produces an output signal bearing an opposite-sign relation to the push-pull signal. A plurality of the forward regions 22 and the reverse regions 24 are arranged alternately in one of the directions set for the diffraction element 17. More specifically, a plurality of the forward regions 22 and the reverse regions 24 are arranged alternately in one of the directions extending at an angle relative to the radial direction Y perpendicular to the tangential direction X of the diffraction element 17.

By virtue of alternate arrangement of a plurality of the forward regions 22 and the reverse regions 24 in one of the directions set for the diffraction element 17, in contrast to a case where a plurality of the forward regions 22 and the reverse regions 24 are not arranged in an alternating manner, it is possible to increase the possibility that the foreign-matter shade 33 extends over the forward region 22 and the reverse region 24 adjacent to each other. Accordingly, in terms of the influence of the foreign-matter shade 33 on the push-pull signal, the timewise difference between the output signal corresponding to the forward region 22 and the output signal corresponding to the reverse region 24 can be lessened. This makes it possible to achieve mutual cancellation of the influence of the foreign-matter shade 33 on the forward region 22 and that on the reverse region 24 in the performance of push-pull signal calculation, and thereby suppress push-pull signal fluctuation resulting from the on-the-diffraction-element 17 movement of the foreign-matter shade 33 projected on the diffraction element 17. Moreover, radial error correction is carried out in accordance with push-pull signal calculation, wherefore the light-receiving element 16 used to read signals recorded on the optical recording medium 11 can be used also for control and driving of the objective lens 13. In this case, as compared with a case where the light-receiving element 16 is not adaptable to shared use, reduction in apparatus size can be achieved.

Moreover, according to the first embodiment, the diffraction element 17 includes the first diffraction region 31 and the second diffraction region 34. The first diffraction region 31 diffracts the incident light so that it can be directed to the push-pull light-receiving region. The second diffraction region 34 diffracts the incident light so that it can be directed to the offset light-receiving region. A plurality of the first diffraction regions 31 and the second diffraction regions 34 are arranged alternately in one of the directions set for the diffraction element 17. This makes it possible to decrease the possibility that the foreign-matter shade 33 affects only one of the first diffraction region 31 and the second diffraction region 34 on the diffraction element 17, and thereby decrease the possibility that the foreign-matter shade 33 affects only one of the push-pull light-receiving region and the offset light-receiving region of the light receiving element 16. This in turn makes it possible to eliminate the influence of the simple diffraction light entering the simple area from the quantity of the light entering the bright-dark contrast area 35 on the diffraction element 17, as well as to achieve cancellation of the influences of the foreign-matter shade 33. In consequence, a higher degree of accuracy in the push-pull signal is achievable compared to the related-art technology.

Moreover, according to the first embodiment, a plurality of the forward regions 22 and the reverse regions 24 are arranged alternately in the tangential direction X of the diffraction element 17. Thereby, when the shade 33 of a foreign matter adherent to the surface of the optical recording medium 11 moves in the tangential direction X on the diffraction element 17, at least part of the foreign-matter shade 33 passes through the forward region 22 and the reverse region 24 alternately several times. Accordingly, in terms of the influence of the foreign-matter shade 33 on the push-pull signal, the timewise difference between the output signal corresponding to the forward region 22 and the output signal corresponding to the reverse region 24 can be lessened, wherefore push-pull signal fluctuation resulting from the on-the-diffraction-element 17 movement of the foreign-matter shade 33 projected on the diffraction element 17 can be suppressed. Moreover, it is possible to decrease the possibility that the foreign-matter shade 33 is projected lopsidedly on a side of one of the forward region 22 and the reverse region 24. Therefore, the influence of the foreign-matter shade 33 projected on the forward region 22 and that of the foreign-matter shade 33 projected on the reverse region 24 cancel each other out with the consequence that push-pull signal fluctuation resulting from the movement of the foreign-matter shade 33 on the diffraction element 17 can be suppressed.

Moreover, according to the first embodiment, at least one of + first order diffraction light and − first order diffraction light resulting from diffraction in the diffraction element 17 enters the light-receiving region 20. Accordingly, as compared with the case of utilizing zeroth order diffraction light in lieu of ± first order diffraction light, the distance between the diffraction element 17 and the light-receiving element 16 can be made shorter. Although there is a need to secure a sufficient distance between the diffraction element 17 and the light-receiving element 16 to space a plurality of the light-receiving regions 20 apart in the light-receiving element 16 for the sake of positive distinction, by utilizing ± first order diffraction light, it is possible to arrange a plurality of se light-receiving regions 20 spacedly while shortening the distance between the diffraction element 17 and the light-receiving element 16.

Moreover, according to the first embodiment, the light-receiving element 16 further includes the focus error detecting region 21, and the diffraction element 17 further includes the focus-error diffraction region. The focus error detecting region 21 included in the light-receiving element 16 is a region for effecting focus error detection. The focus-error diffraction region included in the diffraction element 17 acts to diffract the incident light so that it can be directed to the focus error detecting region 21.

In this way, focus error detection and radial error detection can be achieved by the common diffraction element 17 and light-receiving element 16. Therefore, as compared with the case of disposing one of the diffraction element 17 and the light-receiving element 16 in a separate unit for focus error detection and radial error detection, the optical pickup apparatus 10 can be made more compact.

Moreover, according to the first embodiment, the control-driving section 14 produces a focus error signal in response to the output signal from the focus error detecting region 21 by means of the knife edge method. In this case, as compared with the case of effecting focus error detection by means of the differential push pull method, the light-receiving region 20 used for focus error detection can be smaller in size, wherefore the optical pickup apparatus 10 can be made more compact.

Moreover, according to the first embodiment, the light source 12, the diffraction element 17, and the light-receiving element 16 are combined in a single-piece unit. Accordingly, when installed in combination with other components, the optical pickup apparatus can be handled with the light source 12, the diffraction element 17, and the light-receiving element 16 secured in their relative positions. This leads to easiness in mounting operation.

Second Embodiment

FIGS. 5A and 5B are plan views of the light-receiving element 16 and the diffraction element 17 of the optical pickup apparatus 10 in accordance with a second embodiment, as viewed in the optical-axis direction Z. The optical pickup apparatus 10 of the second embodiment is analogous to the optical pickup apparatus 10 of the first embodiment. Therefore, the following description deals mainly with the points of difference of the second embodiment from the first embodiment.

FIG. 5A is a plan view of the light-receiving element 16 as viewed in the optical-axis direction Z. FIG. 5B is a plan view of the diffraction element 17 as viewed from the optical recording medium 11 in the optical-axis direction Z. In the second embodiment, as shown in FIG. 5A, the light-receiving element 16 includes seven light-receiving regions 20, namely the first to seventh light-receiving regions $20a$, $20b$, $20c$, $20d$, $20e$, $20f$, and $20g$. Moreover, as shown in FIG. 5B, the diffraction element 17 is circular in shape as seen in the optical-axis direction Z, and is divided into a plurality of diffraction regions by a plurality of dividing lines. Out of the dividing lines, the first dividing line s1 extends in the radial direction Y while passing through the center O of a circle representing the contour of the diffraction element 17 to define the diameter of the circle.

The reflected backward light 28 entering the diffraction element 17 forms a circular irradiated area extending over a plurality of the diffraction regions on the diffraction element 17. That part of the irradiated area which is close to the center O of the circle representing the contour of the diffraction element 17 is luminous with the highest light intensity. The second and third dividing lines s2 and s3 are located away from the most luminous part of the irradiated area near the center O of the circle representing the contour of the diffraction element 17. The second dividing line s2 extends in one tangential direction X1 from a point on the first dividing line s1 slightly spaced toward extreme one-radial-direction-Y1 position from the center O.

The third dividing line s3 extends in one tangential direction X1 from a point on the first dividing line s1 slightly spaced toward extreme other-radial-direction-Y2 position from the center O. The second and third dividing lines s2 and s3 are not formed on the other-tangential-direction-X2 side with respect to the first dividing line s1. Each of the second and third dividing lines s2 and s3 is, at its one tangential direction X1-side end, intersected by the circle representing the contour of the diffraction element 17.

The fourth dividing line s4 extends in one radial direction Y1 from a point of dividing the second dividing line s2 into two substantially equal parts in the tangential direction X. The fifth dividing line s5 extends in one radial direction Y1 from a point slightly spaced toward extreme one-tangential-direction-X1 position from a point of intersection of the second dividing line s2 and the fourth dividing line s4. The sixth dividing line s6 extends in one radial direction Y1 from a point slightly spaced toward extreme one-tangential-direction-X1 position from a point of intersection of the fifth dividing line s5 and the second dividing line s2. The fourth to sixth dividing lines s4, s5, and s6 are formed in parallel with one another, of which each is, at its other radial direction Y2-side end, intersected by the second dividing line s2, and is, at its one radial direction Y1-side end, intersected by the circle representing the contour of the diffraction element 17.

The seventh dividing line s7 extends in the other radial direction Y2 from a point of dividing the third dividing line s3 into two substantially equal parts in the tangential direction X. The eighth dividing line s8 extends in the other radial direction Y2 from a point slightly spaced toward extreme one-tangential-direction-X1 position from a point of intersection of the third dividing line s3 and the seventh dividing line s7. The ninth dividing line s9 extends in the other radial direction Y2 from a point slightly spaced toward extreme one-tangential-direction-X1 position from a point of intersection of the eighth dividing line s8 and the third dividing line s3. The seventh to ninth dividing lines s7, s8, and s9 are formed in parallel with one another, of which each is, at its one radial direction Y1-side end, intersected by the third dividing line s3, and is, at its other radial direction Y2-side end, intersected by the circle representing the contour of the diffraction element 7.

The tenth dividing line s10 is a U-shaped line which surrounds, in conjunction with part of the second dividing line s2, a rectangular diffraction regions. The rectangular region is placed on the one-radial-direction-Y1 side with respect to the second dividing line s2 in contact with the second dividing line s2, and lies at a position substantially midway between the first dividing line s1 and the fourth dividing line s4 in the tangential direction X. The rectangular region is located on the other-radial-direction-Y2 side with respect to, of the two bright-dark contrast areas 35, the one radial direction Y1-side bright-dark contrast area 35.

The eleventh dividing line s11 is a U-shaped line which surrounds, in conjunction with part of the third dividing line s3, a rectangular diffraction regions. The rectangular region is placed on the other-radial-direction-Y2 side with respect to the third dividing line s3 in contact with the third dividing line s3, and lies at a position substantially midway between the first dividing line s1 and the seventh dividing line s7 in the tangential direction X. The rectangular region is located on the one-radial-direction-Y1 side with respect to, of the two bright-dark contrast areas 35, the other radial direction Y2-side bright-dark contrast area 35.

In the reflected backward light 28 that reached the diffraction element 17 from the optical recording medium 11, the light beam diffracted in the diffraction region M12 lying on the other-tangential-direction-X2 side with respect to the first dividing line s1 enters the first and second light-receiving regions 20a and 20b. This condition can be restated as follows: this diffraction region corresponds to the first and second light-receiving regions 20a and 20b. The first and second light-receiving regions 20a and 20b produce an output signal A and an output signal B, respectively.

The diffraction region M13d which lies on the one-radial-direction-Y1 side with respect to the second dividing line s2, lies on the one-tangential-direction-X1 side with respect to the first dividing line s1, lies on the other-tangential-direction-X2 side with respect to the fourth dividing line s4, and lies outside the tenth dividing line s10 corresponds to the fourth light-receiving region 20d. The diffraction region M14f which lies on the one-radial-direction-Y1 side with respect to the second dividing line s2, lies on the one-tangential-direction-X1 side with respect to the fourth dividing line s4, and lies on the other-tangential-direction-X2 side with respect to the fifth dividing line s5 corresponds to the sixth light-receiving region 20f.

The diffraction region M15d which lies on the one-radial-direction-Y1 side with respect to the second dividing line s2, lies on the one-tangential-direction-X1 side with respect to the fifth dividing line s5, and lies on the other-tangential-direction-X2 side with respect to the sixth dividing line s6 corresponds to the fourth light-receiving region 20d. The diffraction region M16f which lies on the one-radial-direction-Y1 side with respect to the second dividing line s2 and lies on the one-tangential-direction-X1 side with respect to the sixth dividing line s5 corresponds to the sixth light-receiving region 20f. The rectangular diffraction region M17f surrounded by part of the second dividing line s2 and the tenth dividing line s10 corresponds to the sixth light-receiving region 20f.

The diffraction region M18c which lies on the other-radial-direction-Y2 side with respect to the third dividing line s3, lies on the one-tangential-direction-X1 side with respect to the first dividing line s1, lies on the other-tangential-direction-X2 side with respect to the seventh dividing line s7, and lies outside the eleventh dividing line s11 corresponds to the third light-receiving region 20c. The diffraction region M19e which lies on the other-radial-direction-Y2 side with respect to the third dividing line s3, lies on the one-tangential-direction-X1 side with respect to the seventh dividing line s7, and lies on the other-tangential-direction-X2 side with respect to the eighth dividing line s8 corresponds to the fifth light-receiving region 20e.

The diffraction region M20c which lies on the other-radial-direction-Y2 side with respect to the third dividing line s3, lies on the one-tangential-direction-X1 side with respect to the eighth dividing line s8, and lies on the other-tangential-direction-X2 side with respect to the ninth dividing line s9 corresponds to the third light-receiving region 20c. The diffraction region M21e which lies on the other-radial-direction-Y2 side with respect to the third dividing line s3 and lies on the one-tangential-direction-X1 side with respect to the ninth dividing line s9 corresponds to the fifth light-receiving region 20e. The rectangular diffraction region M22e surrounded by part of the third dividing line s3 and the eleventh dividing line s11 corresponds to the fifth light-receiving region 20e.

The diffraction region 36 which lies on the one-tangential-direction-X1 side with respect to the first dividing line s1, lies on the other-radial-direction-Y2 side with respect to the second dividing line s2, and lies on the one-radial-direction-Y1 side with respect to the third dividing line s3 corresponds to the seventh light-receiving region 20g. Given that a signal outputted from the first light-receiving region 20a is A, a signal outputted from the second light-receiving region 20b is B, a signal outputted from the third light-receiving region 20c is C, a signal outputted from the fourth light-receiving region 20d is D, a signal outputted from the fifth light-receiving region 20e is E, a signal outputted from the sixth light-receiving region 20f is F, and a signal outputted from the seventh light-receiving region 20g is G, then, in the second embodiment, the push-pull signal DPP can be calculated in accordance with the formula (2) just as is the case with the first embodiment.

Thus, the diffraction region corresponding to the third light-receiving region 20c outputting the output signal C is the forward region 22; the diffraction region corresponding to the fourth light-receiving region 20d outputting the output signal D is the reverse region 24; the diffraction region corresponding to the fifth light-receiving region 20e outputting the output signal E is the reverse region 24; and the diffraction region corresponding to the sixth light-receiving region 20f outputting the output signal F is the forward region 22.

Accordingly, where the diffraction regions arranged on the one-radial-direction-Y1 side with respect to the second dividing line s2 and in the vicinity of the second dividing line s2 are concerned, when viewed in one tangential direction X1-to-the other tangential direction X2 order, they are alternately the forward region 22 corresponding to the sixth light-receiving region 20f outputting the output signal F and the reverse region 24 corresponding to the fourth light-receiving region 20d outputting the output signal D.

Moreover, where the diffraction regions arranged on the other-radial-direction-Y2 side with respect to the third dividing line s3 and in the vicinity of the third dividing line s3 are concerned, when viewed in one tangential direction X1-to-the other tangential direction X2 order, they are alternately the reverse region 24 corresponding to the fifth light-receiving region 20e outputting the output signal E and the forward region 22 corresponding to the third light-receiving region 20c outputting the output signal C.

In the second embodiment, the diffraction element 17 includes the second diffraction region 34 which is formed so that the radial direction Y becomes its lengthwise direction. The radial direction Y is perpendicular to the tangential direction X on the diffraction element 17. The shape of the second diffraction region 34 is so determined that the quantity of light entering the second diffraction region 34 is proportional to the amount of deviation of the objective lens 13 from the track in a direction corresponding to the radial direction Y.

The light-receiving element 16 includes an independent light-receiving region. An output signal from the independent light-receiving region is not used for push-pull signal calculation. The diffraction element 17 includes additionally an independent diffraction region 36 and the second diffraction region 34. The independent diffraction region 36 is formed centrally of the diffraction element 17 in the radial direction Y, and diffracts the incident light so that it can be directed to the independent light-receiving region. The second diffraction region 34 is formed outwardly from the independent diffraction region 36 in the radial direction Y. The second diffraction region 34 is formed so that the radial direction Y becomes its lengthwise direction. A plurality of the second diffraction regions 34 spaced apart in the tangential direction X have different radial Y lengths.

Referring to FIG. 5B, the second diffraction regions 34 take shape with the rectangular diffraction region M17f surrounded by part of the second dividing line s2 and the tenth dividing line s10, the rectangular diffraction region M22e surrounded by part of the third dividing line s3 and the eleventh dividing line s11, the diffraction region M14f lying on the one-tangential-direction-X1 side with respect to the fourth dividing line s4 and lying on the other-tangential-direction-X2 side with respect to the fifth dividing line s5, the diffraction region M19e lying on the one-tangential-direction-X1 side with respect to the seventh dividing line s7 and lying on the other-tangential-direction-X2 side with respect to the eighth dividing line s8, the diffraction region M16f lying on the one-radial-direction-Y1 side with respect to the second dividing line s2 and lying on the other-tangential-direction-X1 side with respect to the sixth dividing line s6, and the diffraction region M21e lying on the one-radial-direction-Y2 side with respect to the third dividing line s3 and lying on the other-tangential-direction-X1 side with respect to the ninth dividing line s9.

The independent diffraction region 36 refers to the diffraction region which lies on the one-tangential-direction-X1 side with respect to the first dividing line s1, lies on the other-radial-direction-Y2 side with respect to the second dividing line s2, and lies on the one-radial-direction-Y1 side with respect to the third dividing line s3. The signal G outputted from the seventh light-receiving region 20g corresponding to the independent diffraction region 36 is not used to calculate the push-null signal for radial error correction. The output signal G from the independent diffraction region 36 is thus independent of the push-pull signal DPP. The seventh light-receiving region 20g is defined as the independent light-receiving region. In a case where the light-receiving element 16 is devoid of the independent light-receiving region, the light diffracted in the independent diffraction region 36 may be caused to enter other part than the light-receiving element 16 that is not used for push-pull signal calculation. Moreover, the independent diffraction region 36 does not necessarily have to take part in output-signal production.

In the present embodiment, a plurality of the second diffraction regions 34 take shape with part of the forward regions 22 and part of the reverse regions 24. The shape and the radial Y length of each of a plurality of the second diffraction regions 34 are determined in advance in such a way that the sum total of the output signals from a plurality of the second diffraction regions 34 is proportional to the amount of radial Y deviation of the objective lens 13 from the track, and in consideration of the diameter of the irradiated area formed on the diffraction element 17.

The independent diffraction region 36 includes that part of the irradiated area in which the reflected backward light 28 exhibits the highest light intensity. Therefore, by designing the second diffraction region 34 as a diffraction region separate and distinct from the independent diffraction region 36, it is possible to limit the second diffraction region 34 to a region such as that which is relatively low in light intensity, and thereby establish proportionality between the amount of deviation of the objective lens 13 from the track and the sum total of the output signals from a plurality of the second diffraction regions 34.

The second diffraction regions 34 are classified under two groups: a plurality of the second diffraction regions 34 lying on the one-radial-direction-Y1 side with respect to the center O of the diffraction element 17; and a plurality of the second diffraction regions 34 lying on the other-radial-direction-Y2 side with respect to the center O of the diffraction element 17. A plurality of the one radial direction Y1-side second diffraction regions 34, as well as a plurality of the other radial direction Y2-side second diffraction regions 34, are separated from one another in the tangential direction X, and each of them is formed so that the radial direction Y becomes its lengthwise direction. The one radial direction Y1-side second diffraction regions 34, as well as the other radial direction Y2-side second diffraction regions 34, have different radial Y lengths.

A plurality of the one radial direction Y1-side second diffraction regions 34 are arranged with their other radial direction Y2-side ends kept in alignment with one another in the radial direction Y. Likewise, a plurality of the other radial direction Y2-side second diffraction regions 34 are arranged with their one radial direction Y1-side ends kept in alignment with one another in the radial direction Y. Therefore, in terms of area distribution in the radial direction. Y, on the one-radial-direction-Y1 side with respect to the second dividing line s2, the area of the second diffraction regions 34 decreases with increasing proximity to extreme one-radial-direction-Y1 position, whereas, on the other-radial-direction-Y2 side with respect to the third dividing line s3, the area of the second diffraction regions 34 decreases with increasing proximity to extreme the other-radial-direction-Y2 position. By virtue of such an arrangement, as shown in FIG. 6A, proportionality can be established between the sum total of the output signals from the second diffraction regions 34 and the degree of the objective lens 13-caused radial error.

Figure 6A:
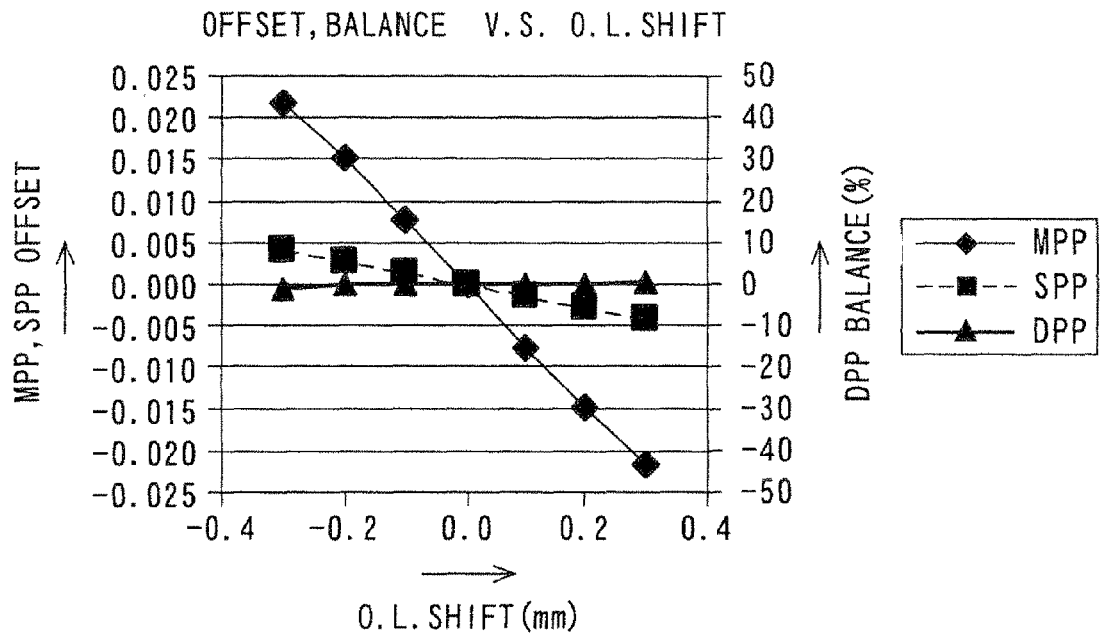
FIGS. 6A and 6B are diagrams showing push-pull signal DPP-related values obtained with use of the light-receiving element, the diffraction element, and the control-driving section pursuant to the second embodiment.
Figure 6B:
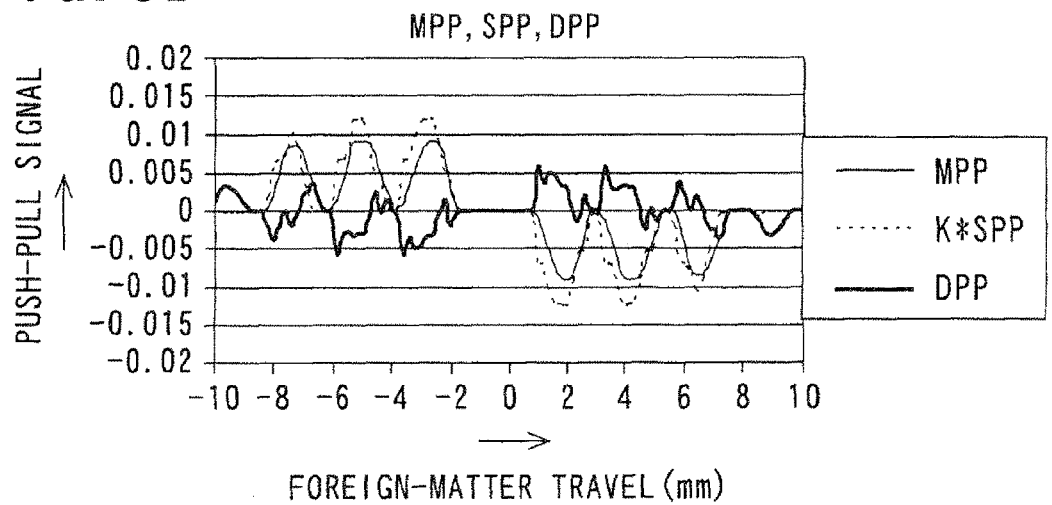

FIGS. 6A and 6B are diagrams showing push-pull signal DPP-related values obtained with use of the light-receiving element 16, the diffraction element 17, and the control-driving section 14 pursuant to the second embodiment of the invention. As shown in FIG. 6A, the rate of change of MPP with respect to objective lens 13-caused radial error is larger than the rate of change of SPP. By setting the arrangement of the second diffraction regions 34 in the aforestated manner, as shown in FIG. 6A, it is possible to render SPP offset proportional to the degree of the objective lens 13-caused radial error. Thereby, DPP can be obtained with high accuracy by exploiting the difference between MPP and SPP multiplied by the constant k.

FIG. 6B is a diagram showing the correlation between the strengths of MPP, k×SPP, and DPP and the amount of tangential X movement of the foreign-matter shade 33 on the diffraction element 17 of the second embodiment. It will be understood from FIG. 6B that MPP and k×SPP are successfully synchronized with each other.

According to the second embodiment, the shape of the second diffraction region 34 is so determined that the quantity of light entering the second diffraction region 34 is proportional to the amount of deviation of the objective lens 13 from the track in a direction corresponding to the radial direction Y. In this case, in contrast to a case where the quantity of light entering the second diffraction region 34 bears a non-linear relationship with the amount of deviation of the objective lens 13 from the track, the formula for push-pull signal calculation can be simplified, wherefore computation cost required for push-pull signal calculation can be reduced correspondingly. This makes it possible to obtain a radial error in a short period of time and with high accuracy, as well as to render the time taken for radial error correction as short as possible. Accordingly, the objective lens 13 which is changed in optimum position with time can be driven under control with high accuracy.

According to the second embodiment, by virtue of the independent diffraction region 36, the increase and decrease of the quantity of light entering the radial Y midportion of the diffraction element 17 is independent of that of the push-pull signal. The second diffraction region 34 is located radially Y outwardly from the independent diffraction region 36, the edges of which extend in the tangential direction X and the radial direction Y. The shape and the radial Y dimension of the second diffraction region 34 are determined properly in advance. In this way, the quantity of light entering the radial Y midportion of the diffraction element 17 that is relatively large in the intensity of incident light per unit area becomes irrelevant to the light quantity used for push-pull signal calculation. This leads to easiness in determining the shape of the second diffraction region 34 in such a manner that the quantity of incident light is proportional to the amount of deviation of the objective lens 13 from the track.

Third Embodiment

FIGS. 7A and 7B are plan views of the light-receiving element 16 and the diffraction element 17 of the optical pickup apparatus 10 in accordance with a third embodiment, as viewed in the optical-axis direction Z. The optical pickup apparatus 10 of the third embodiment is analogous to the optical pickup apparatus 10 of the first embodiment. Therefore, the following description deals mainly with the points of difference of the third embodiment from the first embodiment.

In the third embodiment, the diffraction element 17 includes regions 39 of which each constitutes at least part of either of the forward region 22 and the reverse region 24. At least part of the regions 39 is rectangularly formed so that the tangential direction X becomes its lengthwise direction. This region 39 is termed "predetermined tangential region" 39. A plurality of the forward regions 22 and the reverse regions 24 are arranged alternately in the radial direction Y of the diffraction element 17. Moreover, the diffraction regions constitute a first array and a second array. In the first array, a plurality of the forward regions 22 and the reverse regions 24 are arranged alternately in the tangential direction X. In the second array, a plurality of the forward regions 22 and the reverse regions 24 are arranged alternately in the radial direction Y.

In the third embodiment, as shown in FIG. 7A, the light-receiving element 16 is the same as that of the first embodiment. As shown in FIG. 7B, the diffraction element 17 is circular in shape as viewed in the optical-axis direction Z, and is divided into a plurality of diffraction regions by a plurality of dividing lines. Out of the dividing lines, the first dividing line s1 extends in the radial direction Y while passing through the center of a circle representing the contour of the diffraction element 17 to define the diameter of the circle. The second dividing line s2 extends in one tangential direction X1 from the center O. The second dividing line s2 is not formed on the other-tangential-direction-X2 side with respect to the center O. The second dividing line s2 is, at its one tangential direction X1-side end, intersected by the circle representing the contour of the diffraction element 17.

The third dividing line s3 is a chord extending in the radial direction Y, and the third dividing line s3 and the second dividing line s2 cross at right angles at a point spaced a distance of approximately half the radius of the circle toward extreme one-tangential-direction-X1 position from the center O. The fourth dividing line s4 is spaced only a short distance toward extreme one-tangential-direction-X1 position from the third dividing line s3, and disposed in parallel with the third dividing line s3. In other words, the fourth dividing line s4 is a chord which is parallel to the third dividing line s3, is spaced away from the center O in the same direction as is the third dividing line s3, and is located outward beyond the third dividing line s3.

The fifth dividing line s5 is a chord spaced toward extreme one-tangential-direction-X1 position from the fourth dividing line s4, and disposed in parallel with the fourth dividing line s4. Each of the third to fifth dividing lines s3, s4, and s5 is, at its lengthwise midpoint (radial Y midpoint), intersected perpendicularly by the second dividing line s2. The sixth dividing line s6 is formed as if to cut out a tangentially X-extending rectangular region which lies on the one-radial-direction-Y1 side with respect to the second dividing line s2, lies on the one-tangential-direction-X1 side with respect to the first dividing line s1, and lies on the other-tangential-direction-X2 side with respect to the third dividing line s3. The seventh dividing line s7 is formed as if to cut out a tangentially X-extending rectangular region which lies on the other-radial-direction-Y2 side with respect to the second dividing line s2, lies on the one-tangential-direction-X1 side with respect to the first dividing line s1, and lies on the other-tangential-direction-X2 side with respect to the third dividing line 53.

In the diffraction element 17, the other tangential direction X2-side diffraction region M23 with respect to the first dividing line s1 corresponds to the first and second light-receiving regions 20a and 20b. The diffraction region M24c which lies on the one-tangential-direction-X1 side with respect to the first dividing line s1, lies on the other-radial-direction-Y2 side with respect to the second dividing line s2, lies on the other-tangential-direction-X2 side with respect to the third dividing line s3, and lies outside the seventh dividing line s7 corresponds to the third light-receiving region 20c. The diffraction region M25d which lies on the one-tangential-direction-X1 side with respect to the first dividing line s1, lies on the one-radial-direction-Y1 side with respect to the second dividing line s2, lies on the other-tangential-direction-X2 side with respect to the third dividing line s3, and lies outside the sixth dividing line s6 corresponds to the fourth light-receiving region 20d.

The diffraction region M26e which lies on the one-tangential-direction-X1 side with respect to the third dividing line s3, lies on the other-tangential-direction-X2 side with respect to the fourth dividing line s4, and lies on the other-radial-direction-Y2 side with respect to the second dividing line s2 corresponds to the fifth light-receiving region 20e. The diffraction region M27f which lies on the one-tangential-direction-X1 side with respect to the third dividing line s3, lies on the other-tangential-direction-X2 side with respect to the fourth dividing line 54, and lies on the one-radial-direction-Y1 side with respect to the second dividing line s2 corresponds to the sixth light-receiving region 20f.

The diffraction region M28c which lies on the one-tangential-direction-X1 side with respect to the fourth dividing line s4, lies on the other-tangential-direction-X2 side with respect to the fifth dividing line s5, and lies on the other-radial-direction-Y2 side with respect to the second dividing line s2 corresponds to the third light-receiving region 20c. The diffraction region M29d which lies on the one-tangential-direction-X1 side with respect to the fourth dividing line s4, lies on the other-tangential-direction-X2 side with respect to the fifth dividing line s5, and lies on the one-radial-direction-Y1 side with respect to the second dividing line s2 corresponds to the fourth light-receiving region 20d.

The diffraction region M30e which lies on the one-tangential-direction-X1 side with respect to the fifth dividing line s5 and lies on the other-radial-direction-Y2 side with respect to the second dividing line s2 corresponds to the fifth light-receiving region 20e. The diffraction region M31f which lies on the one-tangential-direction-X1 side with respect to the fifth dividing line s5 and lies on the one-radial-direction-Y1 side with respect to the second dividing line s2 corresponds to the sixth light-receiving region 20f. The rectangular region M32f surrounded by the sixth dividing line s6 corresponds to the sixth light-receiving region 20f. The rectangular region M33e surrounded by the seventh dividing line s7 corresponds to the fifth light-receiving region 20e. In this embodiment, the region M32f and the region M33e are defined as the predetermined tangential region 39 and also as the second diffraction region 34.

In the third embodiment, a plurality of the diffraction regions include an array of the diffraction regions M26e, M27f, M28c, M29d, M30e, and M31f, formed as the first array and another array of the diffraction regions M24c, M25d, M32f, and M33e, formed as the second array. The third dividing line s3 acts as a partition between the first array and the second array in the tangential direction X. That is, formed on the one-tangential-direction-X1 side with respect to the third dividing line s3 is the first array, and formed on the other-tangential-direction-X2 side with respect to the third dividing line s3 is the second array. The diffraction region M23 lying on the other-tangential-direction-X2 side with respect to the first dividing line s1 belongs to neither of the first array and the second array.

Given that the signal strength from the first light-receiving region 20a is A, the signal strength from the second light-receiving region 20b is B, the signal strength from the third light-receiving region 20c is C, the signal strength from the fourth light-receiving region 20d is D, the signal strength from the fifth light-receiving region 20e is E, and the signal strength from the sixth light-receiving region 20f is F, then the push-pull signal DPP is represented by the following formula (2) just as is the case with the first embodiment. The diffraction region corresponding to the third light-receiving region 20c outputting the output signal C is the forward region 22; the diffraction region corresponding to the fourth light-receiving region 20d outputting the output signal D is the reverse region 24; the diffraction region corresponding to the fifth light-receiving region 20e outputting the output signal F is the reverse region 24; and the diffraction region corresponding to the sixth light-receiving region 20f outputting the output signal F is the forward region 22.

Accordingly, where a plurality of the diffraction regions lying on the one-tangential-direction-X1 side with respect to the third dividing line s3 and lying on the one-radial-direction-Y1 side with respect to the second dividing line s2 are concerned, when viewed in one tangential direction X1-to-the other tangential direction X2 order, they are alternately the forward region 22 corresponding to the sixth light-receiving region 20f outputting the output signal F and the reverse region 24 corresponding to the fourth light-receiving region 20d outputting the output signal D in the tangential direction X. On the other hand, where a plurality of the diffraction regions lying on the one-tangential-direction-X1 side with respect to the third dividing line s3 and lying on the other-radial-direction-Y2 side with respect to the second dividing line s2 are concerned, when viewed in one tangential direction X1-to-the other tangential direction X2 order, they are alternately the reverse region 24 corresponding to the fifth light-receiving region 20e outputting the output signal E and the forward region 22 corresponding to the third light-receiving region 20c outputting the output signal. C in the tangential direction X. In the first array, a larger number of the forward regions 22 and reverse regions 24 than as shown in FIG. 7B may be arranged alternately in the tangential direction X.

Moreover, where the other tangential direction X2-side region with respect to the third dividing line s3 located at a position substantially midway between the first dividing line s1 and the third dividing line s3 in the tangential direction X is concerned, when viewed in one radial direction Y1-to-the other radial direction 12 order, there are arranged the reverse region 24 corresponding to the fourth light-receiving region 20d outputting the output signal D, the forward region 22 corresponding to the sixth light-receiving region 20f outputting the output signal F, and again the reverse region 24 corresponding to the fourth light-receiving region 20d outputting the output signal D, and further arranged the forward region 22 corresponding to the third light-receiving region 20c outputting the output signal C, the reverse region 24 corresponding to the fifth light-receiving region 20e outputting the output signal E, and again the forward region 22 corresponding to the third light-receiving region 20c outputting the output signal C. That is, formed on the other-tangential-direction-X2 side with respect to the third dividing line s3 is the second array in which a plurality of the forward regions 22 and the reverse regions 24 are arranged alternately in the radial direction Y.

According to the third embodiment, the tangentially X-elongated rectangular diffraction region M32f surrounded by the sixth dividing line s6 and the tangentially X-elongated rectangular diffraction region M33e surrounded by the seventh dividing line s7 are formed as the predetermined tangential regions 39. The predetermined tangential region 39 is rectangularly formed so that the tangential direction X becomes its lengthwise direction. This helps increase the possibility that, in the diffraction element 17, the foreign-matter shade 33 extends over the forward region 22 and the reverse region 24 adjacent to each other in the radial direction Y. When the foreign-matter shade 33 extends over the forward region 22 and the reverse region 24 adjacent to each other, in terms of the influence of the foreign-matter shade 33 on the push-pull signal, a signal from the forward region 22 and a signal from the reverse region 24 can be synchronized with each other. Accordingly, push-pull signal fluctuation resulting from the on-the-diffraction-element 17 movement of the foreign-matter shade 33 projected on the diffraction element 17 can be suppressed.

Moreover, according to the third embodiment, a plurality of the forward regions 22 and the reverse regions 24 are arranged alternately in the radial direction Y of the diffraction element 17. By doing so, in contrast to the case of arranging a plurality of the forward regions 22 and the reverse regions 24 alternately in the tangential direction X of the diffraction element 17, it is possible to easily insure timewise synchronization between the foreign-matter shade 33's projective entrance to the forward region 22 and its projective entrance to the reverse region 24. Meanwhile, the alternate arrangement of the forward regions 22 and the reverse regions 24 in the tangential direction X affords the advantage to decrease the possibility that the foreign-matter shade 33 is projected lopsidedly on one side, i.e. one of the forward region 22 and the reverse region 24. By contrast, with the alternate arrangement of the forward regions 22 and the reverse regions 24 in the radial direction Y, the influence of the foreign-matter shade 33, which is projected so as to extend over the adjacent forward region 22 and reverse region 24, on the forward region 22 and that on the reverse region 24 can be perfectly synchronized with each other. In consequence, the foreign-matter influence on the forward region 22 and that on the reverse region 24 cancel each other out.

Moreover, according to the third embodiment, the diffraction regions constitute the first array and the second array. In the first array, a plurality of the forward regions 22 and the reverse regions 24 are arranged alternately in the tangential direction X. In the second array, a plurality of the forward regions 22 and the reverse regions 24 are arranged alternately in the radial direction Y. Therefore, it is also possible to form the first array in that part of the diffraction element 17 in which a phase difference arises between the waveform of the output signal corresponding to the forward region 22 and the waveform of the output signal corresponding to the reverse region 24, as well as to form the second array in that part of the diffraction element 17 in which the waveform of the output signal corresponding to the forward region 22 and the waveform of the output signal corresponding to the reverse region 24 are in the same phase. Accordingly, in contrast to the case of arranging a plurality of the forward regions 22 and the reverse regions 24 alternately in only one specific direction in the diffraction element 17, in terms of the influence of the foreign-matter shade 33 on the push-pull signal, the output signal corresponding to the forward region 22 and the output signal corresponding to the reverse region 24 can be synchronized with each other with a higher degree of accuracy. This helps stabilize the push-pull signal DPP even further.

Fourth Embodiment

Figure 8A:
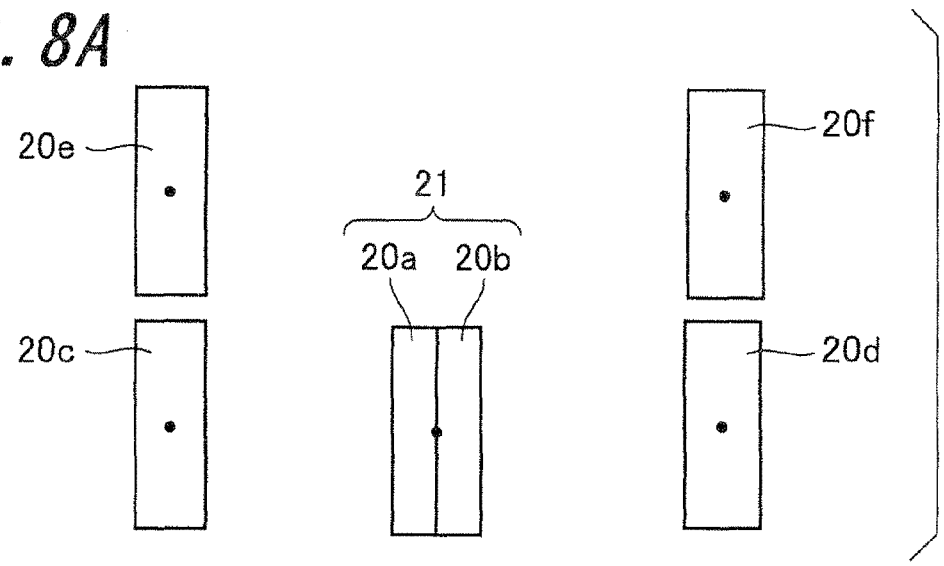
FIGS. 8A and 8B are plan views of the light-receiving element and the diffraction element of the optical pickup apparatus in accordance with a fourth embodiment, as viewed in the optical-axis direction Z.
Figure 8B:
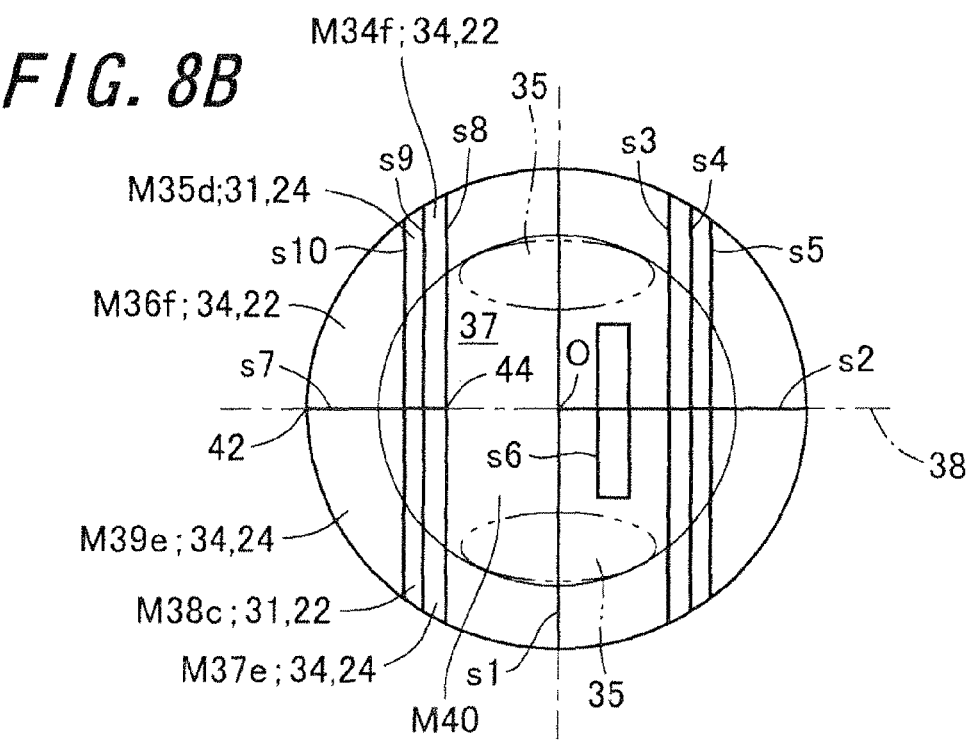
Figure 8B:
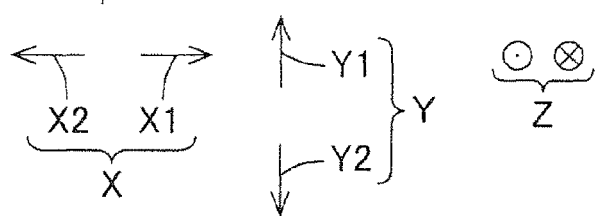

FIGS. 8A and 8B are plan views of the light-receiving element 16 and the diffraction element 17 of the optical pickup apparatus 10 in accordance with a fourth embodiment, as viewed in the optical-axis direction Z. The optical pickup apparatus 10 of the fourth embodiment is analogous to the optical pickup apparatus 10 of the first embodiment. Therefore, the following description deals mainly with the points of difference of the fourth embodiment from the first embodiment.

In the fourth embodiment, the first to sixth dividing lines s1, s2, s3, s4, s5, and s6 formed on the diffraction element 17 are the same as the first to sixth dividing lines s1, s2, s3, s4, s5, and s6 of the first embodiment. Moreover, in the fourth embodiment, on the other-tangential-direction-X2 side of the diffraction element with respect to the first dividing line s1, there are formed additional four dividing lines, namely seventh to tenth dividing lines s7, s8, s9, and s10. A straight line which extends in the tangential direction X while passing through the center O of the diffraction element 17 as viewed in the optical-axis direction Z is termed "predetermined straight line" 38. A point of intersection of the predetermined straight line 38 and the circle representing the contour of the diffraction element 17 on the other-tangential-direction-X2 side with respect to the first dividing line s1 is termed "first intersection point" 42. A point of intersection of the seventh dividing line s7 and the eighth dividing line s8 lies at a position on the predetermined straight line 38 substantially midway between the center O and the first intersection point 42. This point of intersection is termed "second intersection point" 44. The seventh dividing line s7 is so formed as to extend between the second intersection point 44 and the first intersection point 42.

The eighth dividing line s8 extends in the radial direction Y while passing through the second intersection point 44. Spaced only a short distance toward extreme the other-tangential-direction-X2 position from the eighth dividing line s8 is the radially Y-extending ninth dividing line s9. Spaced only a short distance toward extreme the other-tangential-direction-X2 position from the ninth dividing line s9 is the radially Y-extending tenth dividing line 10s. Each of the eighth to tenth dividing lines s8, s9, and s10 is, at its opposite radial ends, intersected by the circle representing the contour of the diffraction element 17. In the diffraction element 17 as viewed in the optical-axis direction Z, the third to fifth dividing lines s3, s4, and s5 and the eighth to tenth dividing lines s8, s9, and s10 are arranged symmetrically about a plane which is perpendicular to the tangential direction X and passes through the center O.

The diffraction region M34f which lies on the one-radial-direction-Y1 side with respect to the seventh dividing line s7, lies on the other-tangential-direction-X2 side with respect to the eighth dividing line s8, and lies on the one-tangential-direction-X1 side with respect to the ninth dividing line s9 corresponds to the sixth light-receiving region 20f. The diffraction region M35d which lies on the one-radial-direction-Y1 side with respect to the seventh dividing line s7, lies on the other-tangential-direction-X2 side with respect to the ninth dividing line s9, and lies on the one-tangential-direction-X1 side with respect to the tenth dividing line s10 corresponds to the fourth light-receiving region 20d. The diffraction region M36f which lies on the one-radial-direction-Y1 side with respect to the seventh dividing line s7 and lies on the other-tangential-direction-X2 side with respect to the tenth dividing line s10 corresponds to the sixth light-receiving region 20f.

The diffraction region M37e which lies on the other-radial-direction-Y2 side with respect to the seventh dividing line s7, lies on the other-tangential-direction-X2 side with respect to the eighth dividing line s8, and lies on the one-tangential-direction-X1 side with respect to the ninth dividing line s9 corresponds to the fifth light-receiving region 20e. The diffraction region M38c which lies on the other-radial-direction-Y2 side with respect to the seventh dividing line s7, lies on the other-tangential-direction-X2 side with respect to the ninth dividing line s9, and lies on the one-tangential-direction-X1 side with respect to the tenth dividing line s10 corresponds to the third light-receiving region 20c. The diffraction region M39e which lies on the other-radial-direction-Y2 side with respect to the seventh dividing line s7 and lies on the other-tangential-direction-X2 side with respect to the tenth dividing line elf corresponds to the fifth light-receiving region 20e.

Thus, the diffraction region M40 which lies on the one-tangential-direction-X1 side with respect to the eighth dividing line s8 and the other-tangential-direction-X2 side with respect to the first dividing line s1 corresponds to the first and the second light-receiving regions, 20a and 20b. In the diffraction region which lies on the one-radial-direction-Y1 side with respect to the seventh dividing line s7 and lies on the other-tangential-direction-X2 side with respect to the eighth dividing line s8, the forward regions 22 corresponding to the sixth light-receiving region 20f and the reverse regions 24 corresponding to the fourth light-receiving region 20d are arranged alternately in the tangential direction X. The tangentially X- and alternately-arranged forward regions 22 and reverse regions 24 can be increased in number.

In the diffraction region which lies on the other-radial-direction-Y2 side with respect to the seventh dividing line s7 and lies on the other-tangential-direction-X2 side with respect to the eighth dividing line 38, the reverse regions 24 corresponding to the fifth light-receiving region 20e and the forward regions 22 corresponding to the third light-receiving region 20c are arranged alternately in the tangential direction X. The tangentially X- and alternately-arranged forward regions 22 and reverse regions 24 can be increased in number.

In this way, the quantity of light entering the fifth, sixth light-receiving region 20e, 20f can be increased compared to the first embodiment. Therefore, in the formula (2) for push-pull signal DPP calculation, the value of k can be reduced. As a result, in the presence of a foreign matter, a flaw, or the like on the optical recording medium 11, the influence of the foreign matter, flaw, etc. on the push-pull signal DPP can be decreased compared to the first embodiment.

Fifth Embodiment

Figure 9A:
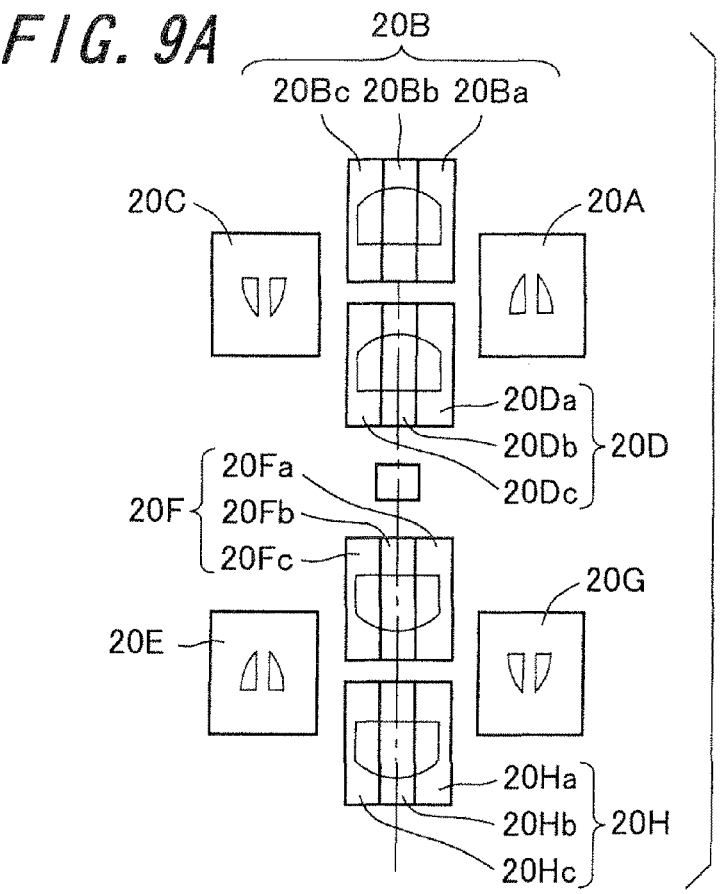
FIGS. 9A and 9B are plan views of the light-receiving element and the diffraction element of the optical pickup apparatus in accordance with a fifth embodiment, as viewed in the optical-axis direction Z.
Figure 9B:
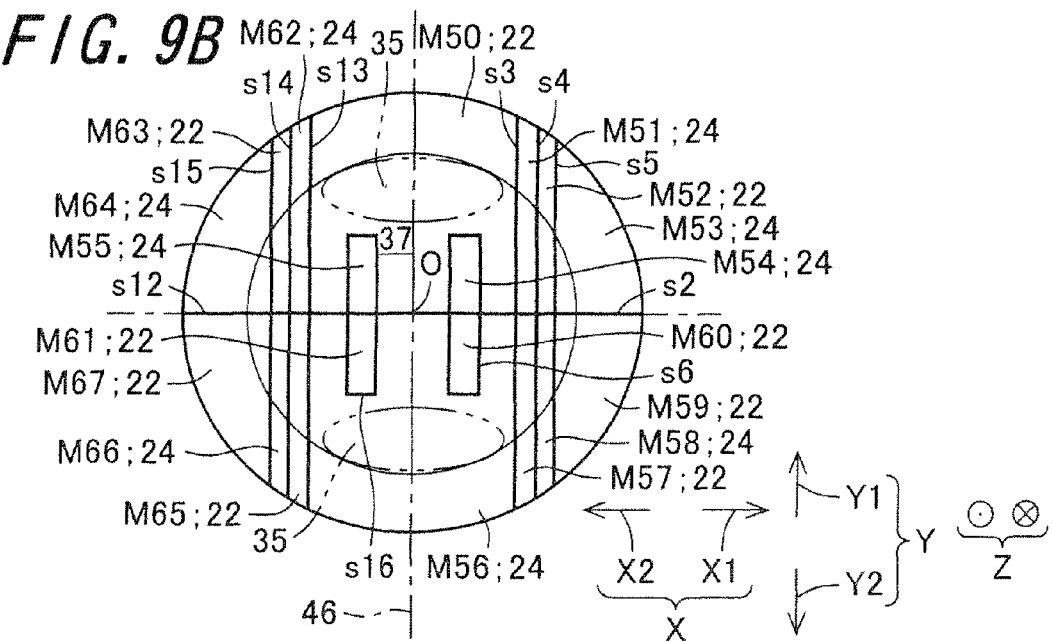

FIGS. 9A and 9B are plan views of the light-receiving element 16 and the diffraction element 17 of the optical pickup apparatus 10 in accordance with a fifth embodiment, as viewed in the optical-axis direction Z. The optical pickup apparatus 10 of the fifth embodiment is analogous to the optical pickup apparatus 10 of the first embodiment. Therefore, the following description deals mainly with the points of difference of the fifth embodiment from the first embodiment.

FIG. 9A is a plan view of the light-receiving element 16, and FIG. 9B is a plan view of the diffraction element 17 as viewed from the optical recording medium 11 in the optical axis direction Z. In the fifth embodiment, the light-receiving element 16 includes eight light-receiving regions 20, namely the first to eighth light-receiving regions 20A, 20B, 20C, 20D, 20E, 20F, 20G, and 20H, of which the second, fourth, sixth, and eighth light-receiving regions 20B, 20D, 20F, and 20H are each subdivided into three small regions. An output signal corresponding to the quantity of light each region receives can be produced on an individual basis.

In the fifth embodiment, the second to sixth dividing lines s2, s3, s4, s5, and s6 formed on the diffraction element 17 are the same as the second to sixth dividing lines s2, s3, s4, s5, and s6 of the first embodiment. The fifth embodiment is devoid of a dividing line similar to the first dividing line s1 of the first embodiment. When a plane which is perpendicular to the tangential direction X and passes through the center O of the diffraction element 17 is termed "imaginary plane" 46, then, in the fifth embodiment, on the other-tangential-direction-X2 side of the diffraction element with respect to the imaginary plane 46, just like the one-tangential-direction-X1 side with respect to the imaginary plane 46, there are formed a plurality of dividing lines. In the diffraction element 17 as viewed in the optical-axis direction Z, a plurality of the dividing lines formed on the diffraction element 17 are arranged symmetrically about the imaginary plane 46.

A dividing line formed in symmetric relation to the second dividing line s2 is defined as the twelfth dividing line s12; a dividing line formed in symmetric relation to the third dividing line s3 is defined as the thirteenth dividing line s13; a dividing line formed in symmetric relation to the fourth dividing line s4 is defined as the fourteenth dividing line s14; a dividing line formed in symmetric relation to the fifth dividing line s5 is defined as the fifteenth dividing line s15; and a dividing line formed in symmetric relation to the sixth dividing line s6 is defined as the sixteenth dividing line s16. The second dividing line s2 and the twelfth dividing line s12 lie on the same straight line.

The diffraction region M50 which lies on the one-radial-direction-Y1 side with respect to the second and the twelfth dividing lines, s2 and s12, lies on the other-tangential-direction-X2 side with respect to the third dividing line s3, lies on the one-tangential-direction-X1 side with respect to the thirteenth dividing line s13, and lies outside the sixth and sixteenth dividing lines s6 and s16 corresponds to the fourth and sixth light-receiving regions 20D and 20. The diffraction region M51 which lies on the one-radial-direction-Y1 side with respect to the second dividing line s2, lies on the one-tangential-direction-X1 side with respect to the third dividing line s3, and lies on the other-tangential-direction-X2 side with respect to the fourth dividing line s4 corresponds to the first and fifth light-receiving regions 20A and 20E.

The diffraction region M52 which lies on the one-radial-direction-Y1 side with respect to the second dividing lines s2 lies on the one-tangential-direction-X1 side with respect to the fourth dividing line s4, and lies on the other-tangential-direction-X2 side with respect to the fifth dividing line s5 corresponds to the fourth and sixth light-receiving regions 20D and 20F. The diffraction region M53 which lies on the one-radial-direction-Y1 side with respect to the second dividing line s2 and lies on the one-tangential-direction-X1 side with respect to the fifth dividing line s5 corresponds to the first and fifth light-receiving regions 20A and 20E. The diffraction region M54 which lies on the one-radial-direction-Y1 side with respect to the second dividing line s2 and lies inside the sixth dividing line s6 corresponds to the first and fifth light-receiving regions 20A and 20E. The diffraction region M55 which lies on the one-radial-direction-Y1 side with respect to the twelfth dividing line s12 and lies inside the sixteenth dividing line s16 corresponds to the first and fifth light-receiving regions 20A and 20E.

The diffraction region M56 which lies on the other-radial-direction-Y2 side with respect to the second and twelfth dividing lines s2 and s12, lies on the other-tangential-direction-X2 side with respect to the third dividing line s3, lies on the one-tangential-direction-X1 side with respect to the thirteenth dividing line s13, and lies outside the sixth and sixteenth dividing lines s6 and s16 corresponds to the second and eighth light-receiving regions 20B and 20H. The diffraction region M57 which lies on the other-radial-direction-Y2 side with respect to the second dividing line s2, lies on the one-tangential-direction-X1 side with respect to the third dividing line s3, and lies on the other-tangential-direction-X2 side with respect to the fourth dividing line s4 corresponds to the third and seventh light-receiving regions 20C and 20G. The diffraction region M58 which lies on the other-radial-direction-Y2 side with respect to the second dividing line s2, lies on the one-tangential-direction-X1 side with respect to the fourth dividing line s4, and lies on the other-tangential-direction-X2 side with respect to the fifth dividing line s5 corresponds to the second and eighth light-receiving regions 20B and 20H.

The diffraction region M59 which lies on the other-radial-direction-Y2 side with respect to the second dividing line s2 and lies on the one-tangential-direction-X1 side with respect to the fifth dividing line s5 corresponds to the third and seventh light-receiving regions 20C and 20G. The diffraction region M60 which lies on the other-radial-direction-Y2 side with respect to the second dividing line s2 and lies inside the sixth dividing line s6 corresponds to the third and seventh light-receiving regions 20C and 20G. The diffraction region M61 which lies on the other-radial-direction-Y2 side with respect to the twelfth dividing line s12 and lies inside the sixteenth dividing line s16 corresponds to the third and seventh light-receiving regions 20C and 20G.

The two regions on opposite sides of the imaginary plane 46, namely the other tangential direction X2-side region and the one tangential direction X1-side region are formed symmetrically about the imaginary plane 46. The diffraction region M62 which lies on the one-radial-direction-Y1 side with respect to the twelfth dividing line s12, lies on the other-tangential-direction-X2 side with respect to the thirteenth dividing line s13, and lies on the one-tangential-direction-X1 side with respect to the fourteenth dividing line s14 corresponds to the first and fifth light-receiving regions 20A and 20E.

The diffraction region M63 which lies on the one-radial-direction-Y1 side with respect to the twelfth dividing line s12, lies on the other-tangential-direction-X2 side with respect to the fourteenth dividing line s14, and lies on the one-tangential-direction-X1 side with respect to the fifteenth dividing line s15 corresponds to the fourth and sixth light-receiving regions 20D and 20F. The diffraction region M64 which lies on the one-radial-direction-Y1 side with respect to the twelfth dividing line s12 and lies on the other-tangential-direction-X2 side with respect to the fifteenth dividing line s15 corresponds to the first and fifth light-receiving regions 20A and 20E.

The diffraction region M65 which lies on the other-radial-direction-Y2 side with respect to the twelfth dividing line s12, lies on the other-tangential-direction-X2 side with respect to the thirteenth dividing line s13, and lies on the one-tangential-direction-X1 side with respect to the fourteenth dividing line s14 corresponds to the third and seventh light-receiving regions 20C and 20G. The diffraction region M66 which lies on the other-radial-direction-Y2 side with respect to the twelfth dividing line s12, lies on the other-tangential-direction-X2 side with respect to the fourteenth dividing line s14, and lies on the one-tangential-direction-X1 side with respect to the fifteenth dividing line s15 corresponds to the second and eighth light-receiving regions 20B and 20H. The diffraction region M67 which lies on the other-radial-direction-Y2 side with respect to the twelfth dividing line s12 and lies on the other-tangential-direction-X2 side with respect to the fifteenth dividing line s15 corresponds to the third and seventh light-receiving regions 20C and 20G.

Light beams which reach the fourth and sixth light-receiving region 20D and 20h are condensed gradually with approach toward the light-receiving element 16, and the distance between a point to which the light beam is expected to converge and the diffraction element 17 is set to be longer than the diffraction element 17-to-the light-receiving element 16 distance. Light beams which reach the second and eighth light-receiving region 20B and 20H are condensed gradually with approach toward the light-receiving element 16, and the distance between a point to which the light beam converges and the diffraction element 17 is set to be shorter than the diffraction element 17-to-the light-receiving element 16 distance. Light beams which reach the first, third, fifth and seventh light-receiving region 20A, 20C, 20E, and 20G are condensed gradually with approach toward the light-receiving element 16, and the distance between a point to which the light beam converges and the diffraction element 17 is set to be equal to the diffraction element 17-to-the light-receiving element 16 distance.

An output signal produced through the incidence of light on the first light-receiving region 20A is designated as R1. An output signal produced through the incidence of light on the second light-receiving region 20B is designated as R2. Likewise, output signals produced through the incidence of light on the third to eighth light-receiving regions 20C, 20D, 20E, 20F, 20G, and 20H, respectively, are designated as R3 to 28, respectively.

Thus, where the diffraction regions arranged on the one-radial-direction-Y1 side with respect to the second and twelfth dividing lines s2 and s12 and in the vicinity of the second and twelfth dividing lines s2 and s12 are concerned, when viewed in one tangential direction X1-to-the other tangential direction X2 order, they are seen being two types of diffraction regions placed in an alternating manner, and more specifically they are alternately the diffraction regions corresponding to the first light-receiving region 20A outputting the output signal R1 and the fifth light-receiving regions 20E outputting the output signal R5 and the diffraction regions corresponding to the fourth light-receiving region 20D outputting the output signal R4 and the sixth light-receiving regions 20F outputting the output signal R6.

Likewise, where the diffraction regions arranged on the other-radial-direction-Y2 side with respect to the second and twelfth dividing lines s2 and s12 and in the vicinity of the second and twelfth dividing lines s2 and s12 are concerned, when viewed in one tangential direction X1-to-the other tangential direction X2 order, they are seen being two types of diffraction regions placed in an alternating manner, and more specifically they are alternately the diffraction regions corresponding to the third light-receiving region 20C outputting the output signal R3 and the seventh light-receiving region 20G outputting the output signal R7 and the diffraction regions corresponding to the second light-receiving region 20B outputting the output signal R2 and the eighth light-receiving region 20H outputting the output signal R8.

In the fifth embodiment, the push-pull signal DPP for radial error correction is calculated by using the following formula (5):

$$DPP = \{(R4all + R6all) - (R2all + R8all)\} - \\ k \times \{(R1 + R5) - (R3 + R7)\} \\ = MPP - k \times SPP \quad (5)$$

Out of the first to eighth light-receiving regions, the second, fourth, sixth, and eighth regions are each subdivided into three small regions. In the formula (5), R2*all*, R4*all*, R6*all*, and R8*all* represent the quantities of the light beams entering the second region, the fourth region, the sixth region, and the eighth region, respectively, and in a sense, each value represents the sum total of quantities of the light beams entering the three small regions, respectively. The quantity of the light beam entering each region of the light-receiving element 16 expressed as the signal strength of a signal outputted from the light-receiving element.

In the formula (5), as (R4*all*+R6*all*) and (R3+R7) are increased, the value of the DPP is increased correspondingly. That is, the terms bear a same-sign relation to the push-pull signal DPP. Accordingly, in the diffraction element 17, the diffraction region corresponding to the fourth and sixth light-receiving regions 20D and 20F and the diffraction region corresponding to the third and seventh light-receiving regions 20C and 20G are the forward regions 22. On the other hand, in the formula (5), as (R2*all*+R8*all*) and (R1+R5) are increased, the value of the DPP is decreased conversely. That is, the terms bear an opposite-sign relation a to the push-pull signal DPP. Accordingly, in the diffraction element 17, the diffraction region corresponding to the second and eighth light-receiving regions 20B and 20H and the diffraction region 32 corresponding to the first and fifth light-receiving regions 20A and 20E are the reverse regions 24.

Once again, where the diffraction regions arranged on the one-radial-direction-X1 side with respect to the second and twelfth dividing lines s2 and s12 and in the vicinity of the second and twelfth dividing lines s2 and s12 are concerned, when viewed in one tangential direction X1-to-the other tangential direction X2 order, they are seen being alternately the reverse regions 24 corresponding to the first light-receiving region 20A outputting the output signal R1 and the fifth light-receiving region 20E outputting the output signal R5 and the forward regions 22 corresponding to the fourth light-receiving region 20D outputting the output signal R4 and the sixth light-receiving region 20F outputting the output signal R6. Likewise, where the diffraction regions arranged on the other-radial-direction-Y2 side with respect to the second and twelfth dividing lines s2 and s12 and in the vicinity of the second and twelfth dividing lines s2 and s12 are concerned, when viewed in one tangential direction X1-to-the other tangential direction X2 order, they are seen being alternately the forward regions 22 corresponding to the third light-receiving region 20C outputting the output signal R3 and the seventh light-receiving region 20G outputting the output signal R7 and the reverse regions 24 corresponding to the second light-receiving region 20B outputting the output signal R2 and the eighth light-receiving region 20H outputting the output signal R8.

In the fifth embodiment, a focus error signal FES is obtained by using the second, fourth, sixth, and eighth light-receiving regions 20B, 20D, 20F, and 20H in accordance with the following formula (6). The second, fourth, sixth, and eighth light-receiving regions 20B, 20D, 20F, and 20H are each subdivided into three small regions, and signals outputted from these small regions are designated as 20Ba, 20Bb, 20Bc, 20Da, 20Db, 20Dc, 20Fa, 20Fb, 20Fc, 20Ha, 20Hb, and 20Hc, respectively. Out of the small regions a, b, and c, the region b is located centrally in the tangential direction.

$$FES = (20Db + 20Hb + 20Ba + 20Bc + 20Fa + 20Fc) - \\ (20Bb + 20Fb + 20Da + 20Dc + 20Ha + 20Hc) \quad (6)$$

Thus, focusing-servo drive control is exercised by performing comparison of the spot diameters of the light beams as observed on the individual light-receiving regions 20, and more specifically by performing spot-diameter comparison between the light beam that entered its respective light-receiving region 20 following diffraction in one of the two diffraction regions on opposite sides of the second and twelfth dividing lines s2 and s12 acting as a borderline in the diffraction element 17, namely the one radial direction Y1-side region, and the light beam that entered its respective light-receiving region 20 following diffraction in the other, namely the other radial direction Y2-side region.

Moreover, by summing up the output signals from the entire light-receiving element 16, just as is the case with the first embodiment, RF signal reproduction is achieved. Since a plurality of the forward regions 22 and the reverse regions 24 are arranged alternately in the tangential direction X of the diffraction element 17, it follows that, in the presence of a foreign matter, a flaw, or the like on the track of the optical recording medium, at least part of the foreign-matter shade 33 passes through the forward regions 22 and the reverse regions 24 alternately several times. This makes it possible to lessen the timewise difference between the output signal corresponding to the forward region 22 and the output signal corresponding to the reverse region 24 in terms of the influence of the foreign-matter shade 33 on the push-pull signal, and thereby prevent inclusion of noise in the push-pull signal resulting from the on-the-diffraction-element 17 movement of the foreign-matter shade 33 projected on the diffraction element 17. Moreover, it is also possible to decrease the possibility that the foreign-matter shade 33 is projected lopsidedly on an side of one of the forward region 22 and the reverse region 24. Therefore, the influences of the foreign-matter shade 33 projected on the forward region 22 and the reverse region 24 cancel each other out with the consequence that push-pull signal fluctuation resulting from the movement of the foreign-matter shade 33 on the diffraction element 17 can be suppressed.

Figure 10:
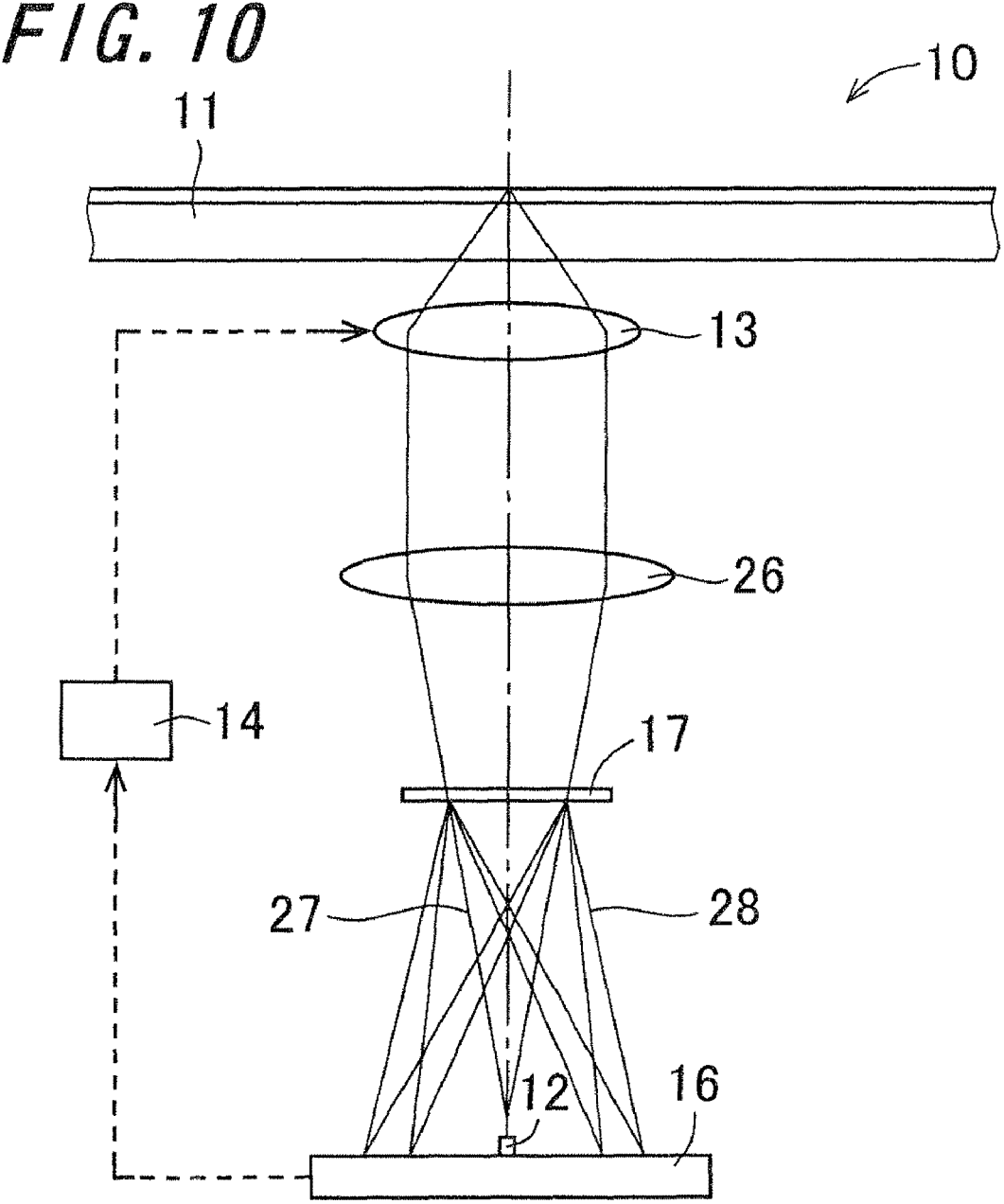
FIG. 10 is a diagram showing the structure of the optical pickup apparatus in accordance with the fifth embodiment.
Figure 11:
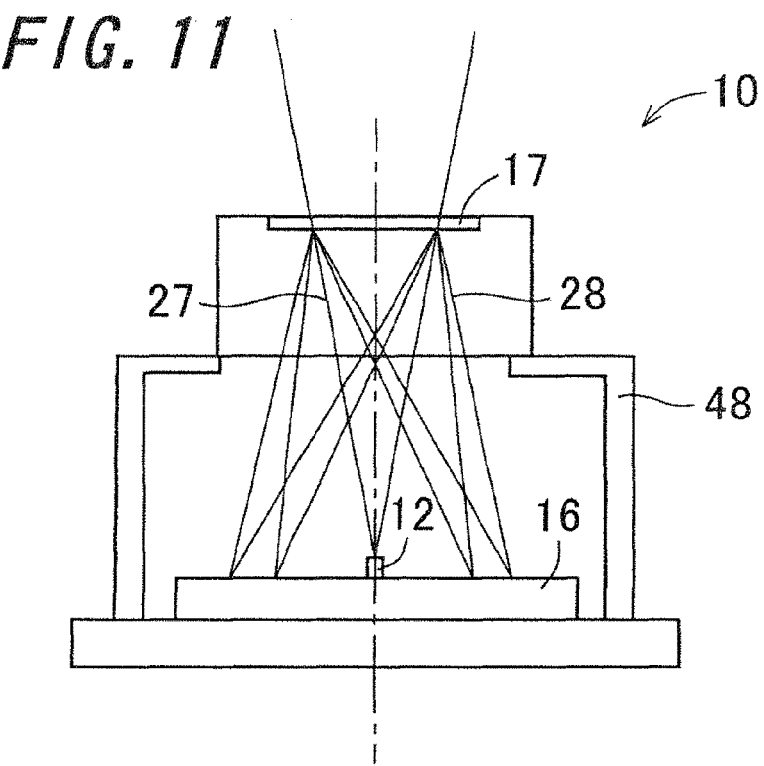
FIG. 11 is a sectional view of a light source unit comprising the light source, the diffraction element, and the light-receiving element of the fifth embodiment as viewed laterally.

FIG. 10 is a diagram showing the structure of the optical pickup apparatus 10 in accordance with the fifth embodiment of the invention. FIG. 11 is a sectional view of a light source unit composed of the light source 12, the diffraction element 17, and the light-receiving element 16 of the fifth embodiment of the invention as viewed laterally. In this embodiment, the light source 12, the diffraction element 17, and the light-receiving element 16 are combined in a single-piece structure. The light source 12 is constructed of a semiconductor laser element. The light source 12 and the light-receiving element 16 are mounted in a frame 48 made of at least one of metal and resin. The frame 48 is provided with a cap having a hole created about the optical axis. In the hole of the cap of the frame 48 is placed the resin- or glass-made diffraction element 17 having a diffraction grating pattern. The light-receiving element 16 is so disposed that its center coincides with the optical axis of the diffraction element 17. That is, the light-receiving element 16 is optical-axially aligned with the diffraction element 17.

In this way, the diffraction element 17, the light source 12, and the light-receiving element 16 are mounted in the form of a single unit for the sake of assembly control of the optical pickup apparatus 10. By doing so, when installed in combination with other components, the optical pickup apparatus can be handled with the light source 12, the diffraction element 17, and the light-receiving element 16 secured in their relative positions. This helps facilitate the manufacture of the optical pickup apparatus 10.

Modification Example

Figure 12:
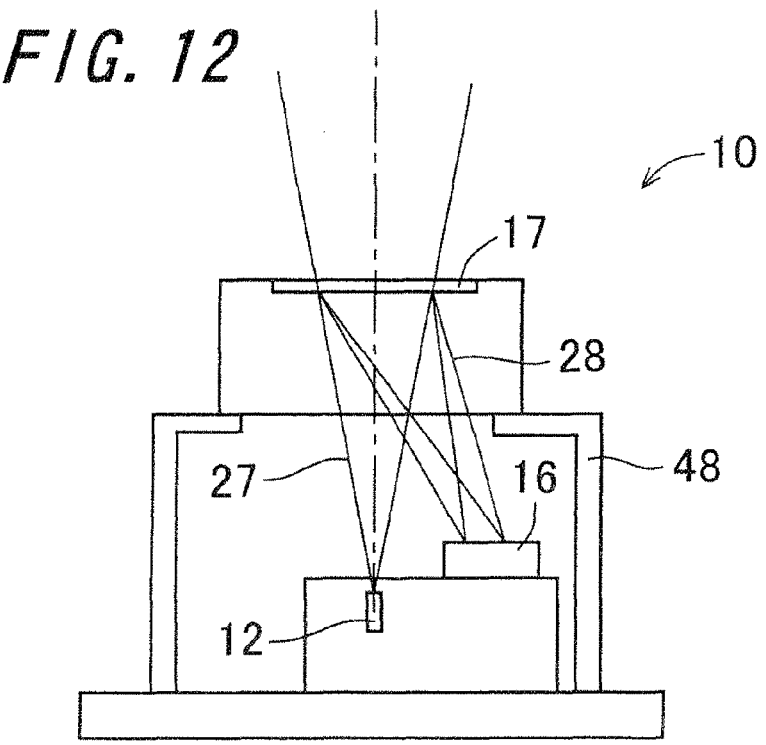
FIG. 12 is a sectional view of a light source unit comprising the light source, the diffraction element, and the light-receiving element in accordance with another embodiment as viewed laterally.
Figure 13A:
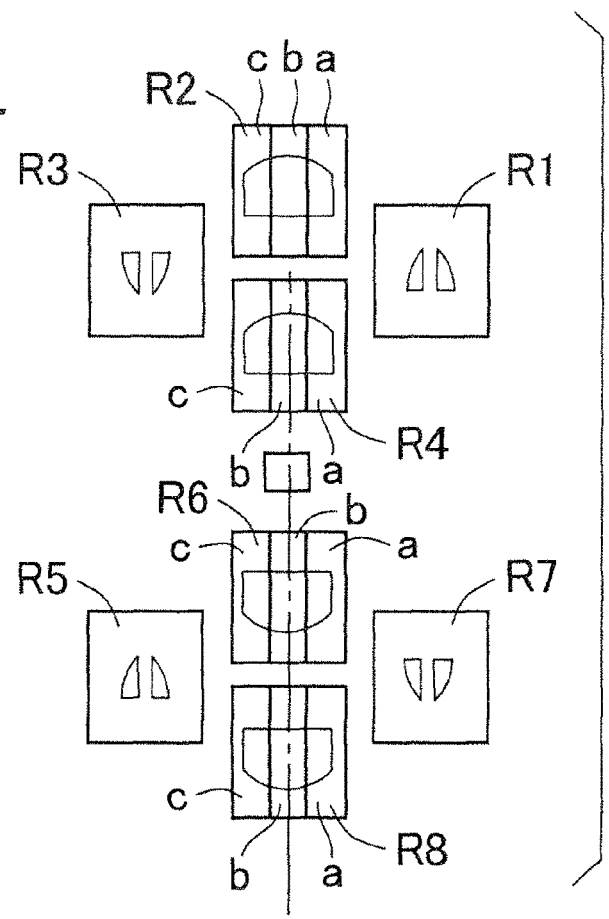
FIG. 13 is a plan view of the light-receiving element and the diffraction element 1 of an optical pickup apparatus in accordance with the related art as viewed in the optical axis direction Z.
Figure 13B:
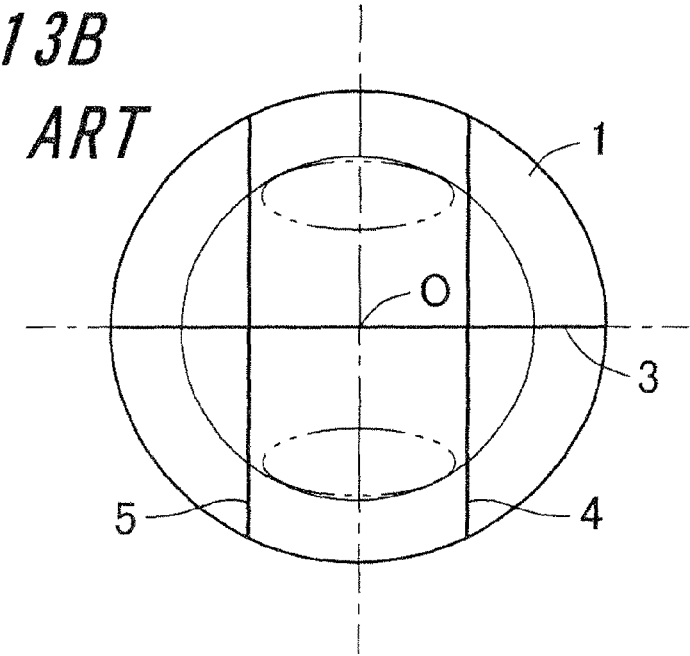
Figure 14:
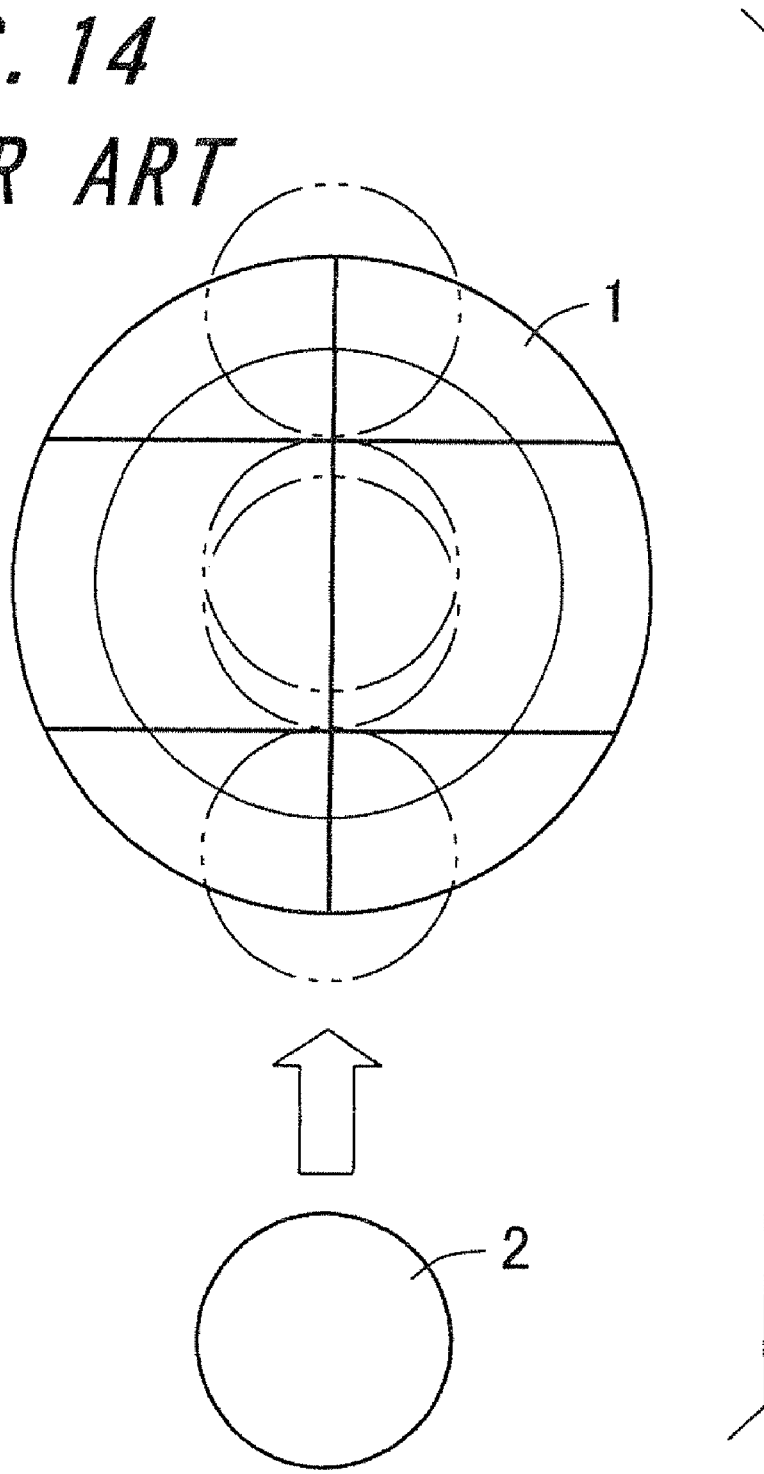
FIG. 14 is a plan view of the diffraction element of an optical pickup apparatus in accordance with the related art as viewed in the optical axis direction Z.
Figure 15A:
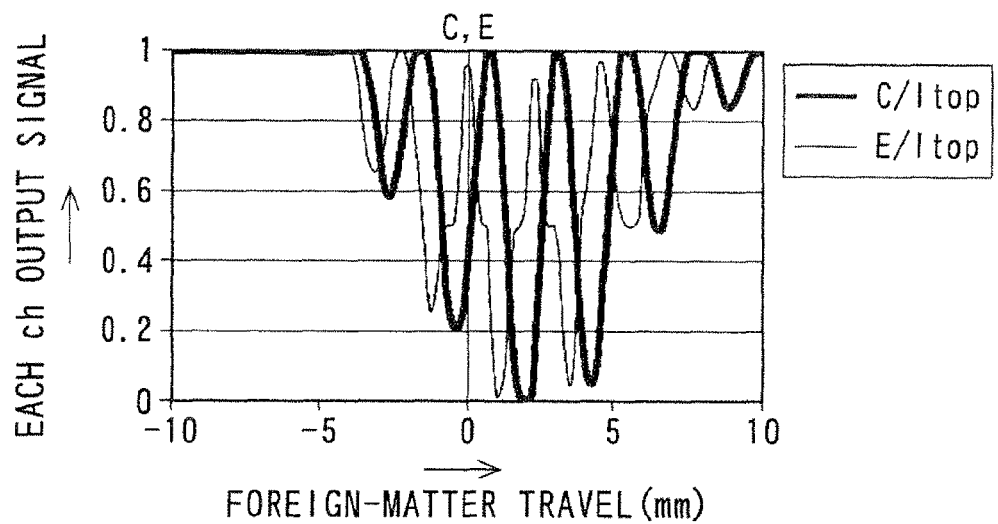
FIGS. 15A to 15C are charts showing the amount of light detected by the light-receiving element when the foreign-matter shade is shifted radially from the position passing through the center of the diffraction element of the optical pickup apparatus in accordance with the related art.
Figure 15B:
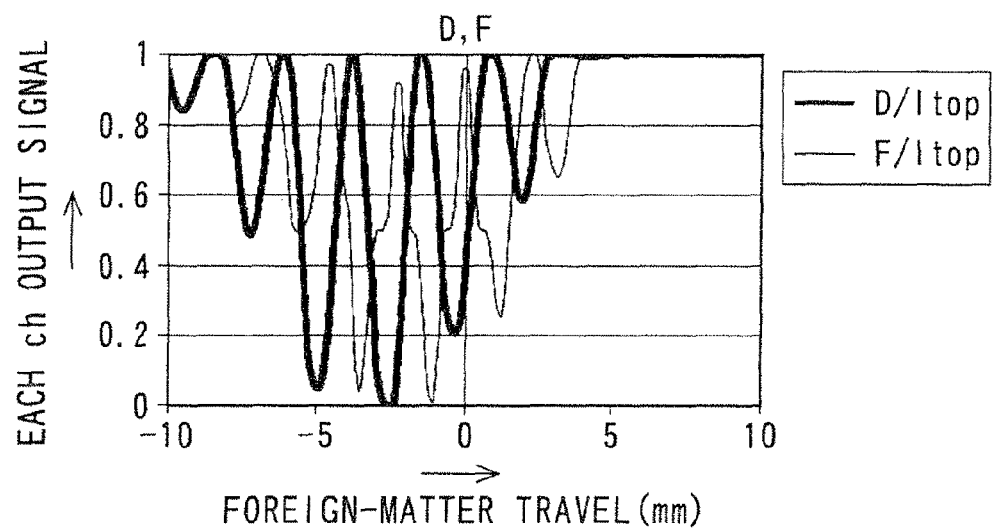
Figure 15C:
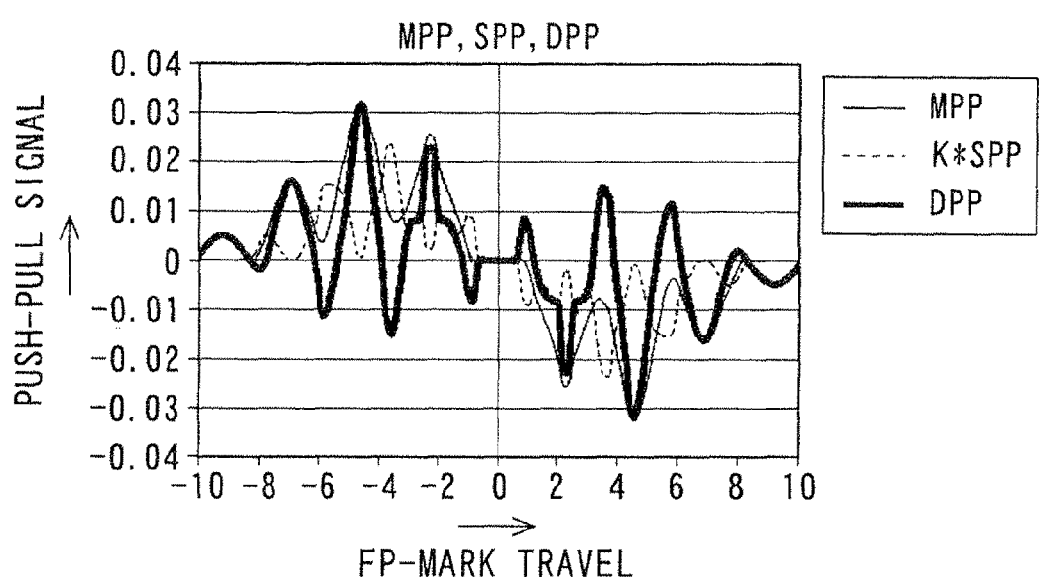

FIG. 12 is a sectional view of a light source unit composed of the light source 12, the diffraction element 17, and the light-receiving element 16 in accordance with another embodiment as viewed laterally. In this embodiment, in contrast to the optical pickup apparatus 10 of, e.g. the fifth embodiment, the light-receiving element is displaced from the optical axis generally centralized on the light source 12. In other respects, for example, in formation of a cap with a hole in the frame 48, placement of the diffraction element 17 therein, etc., the light source unit is similar to that shown in FIG. 11.

While, in the first to fifth embodiments, the forward region 22 and the reverse region 24 are contiguously arranged with a straight line as a borderline, by way of another embodiment, the forward region 22 and the reverse region 24 may be contiguously arranged with a curve line as a borderline. Moreover, in the alternate arrangement of the forward regions 22 and the reverse regions 24 in one direction or in a plurality of directions, they may be provided in a greater number than as suggested in the first to fifth embodiments.

Further, in the first to fifth embodiments, a plurality of the diffraction regions are formed on the diffraction element 17 in such a manner that the two regions on opposite sides of a straight line extending in the tangential direction X while passing through the center O of the diffraction element 17 are arranged in a symmetric fashion. Alternatively, by way of another embodiment, a plurality of the diffraction regions formed on the diffraction element 17 do not necessarily have to be arranged in a line-symmetric fashion, a plane-symmetric fashion, a point-symmetric fashion, or the like.

By way of another embodiment, the control-driving section 14 may be so designed as to produce a focus error signal on the basis of an output signal from the focus error detecting region 21 by means of the beam size method. By doing so, in contrast to the case of detecting a focus error by means of, e.g. the differential push pull method, it is possible to reduce the size of the light-receiving region 20 for focus error detection, and thereby make the optical pickup apparatus 10 more compact.

In the diffraction element 17, given that a predetermined direction-wise dimension of each of the forward regions 22 and the reverse regions 24 alternately arranged in one or a plurality of directions is termed "widthwise dimension", then, the larger is the widthwise dimension exceeding the aforestated range, the lower is the synchronization accuracy of the regions of the same polarity as observed when the foreign-matter shade 33 is projected on the diffraction element 17.

Furthermore, for example, where the said predetermined direction is coincident with the radial direction Y, the possibility of the foreign-matter shade extending over both the forward region 22 and the reverse region 24 may be decreased. In this case, the smaller is the widthwise dimension falling below the range, the more difficult is the manufacture of the diffraction element 17. Besides, the accuracy of light convergence on the diffraction element 17 could be impaired.

In the example embodiment, a plurality of the dividing lines formed on the diffraction element 17 allows formation of the alternately-arranged forward regions 22 and reverse regions 24. The geometries of a plurality of the dividing lines formed on the diffraction element 17 and a plurality of the diffraction regions thereby obtained are not limited to those as suggested in the first to fifth embodiments. For example, by way of another embodiment analogous to the third embodiment, the rectangular region formed by the sixth and seventh dividing line s6 and s7 may be made longer in the tangential direction X enough to reach at least one of the first dividing line s1 and the third dividing line s3.

In order to control and drive the objective lens 13 properly by the differential push pull method for radial error correction, the light-receiving element 16 is required to have a plurality of light-receiving regions 20 capable of producing signals on an individual basis. Considering the incidence of light on a plurality of the light-receiving regions 20, by forming a plurality of the diffraction regions in the diffraction element 17, it is possible to afford greater design flexibility in formation of the light-receiving regions 20 in the light-receiving element 16, and thereby render the use of ± first order diffraction light possible. Accordingly, the optical pickup apparatus 10 can be made more compact.

However, the larger is the number of the light-receiving regions 20 of the light-receiving element 16, and correspondingly the larger is the number of the diffraction regions of the diffraction element 17, the higher is the probability that there arise foreign-matter shade 33-affected regions and foreign-matter shade 33-unaffected regions. That is, the variation in position of the foreign-matter shade 33 on the diffraction element 17 is reflected upon a plurality of different light-receiving regions 20 through light diffraction on different diffraction regions. Therefore, as the foreign-matter shade 33 undergoes displacement with time, detection signals detected by a plurality of the light-receiving regions 20 vary with time correspondingly.

Thus, a phenomenon in which a signal calculated as the push-pull signal DPP fluctuates is associated with miniaturization of the optical pickup apparatus 10 achieved by exploiting the differential push pull method, as well as an increase in the degree of design flexibility for the light-receiving regions 20 of the light-receiving element 16. In conclusion, by preventing push-pull signal DPP fluctuation with a plurality of embodiments thus far described, it is possible to make a notable contribution to miniaturization of the optical pickup apparatus 10.

The present embodiments are to be considered in all respects as illustrative and not restrictive, the scope of the embodiments being indicated by the appended claims rather than by the foregoing description and all changes which come within the meaning and the range of equivalency of the claims are therefore intended to be embraced therein.

What is claimed is:

1. An optical pickup apparatus comprising:
   a light source;
   an objective lens for condensing light emitted from the light source on a surface of an optical recording medium;
   a diffraction element in which the light reflected from the optical recording medium enters;
   a light-receiving element in which a light beam diffracted by the diffraction element enters, the light-receiving element having a plurality of light-receiving regions, each of which produces an output signal responsive to the light quantity of the incident light beam; and a control-driving section that obtains differences among the output signals produced by a plurality of the light-receiving regions by calculation to derive a push-pull signal, and drives the objective lens under control on the basis of the push-pull signal, the diffraction element including:

a forward region that serves to let a light beam enter, out of a plurality of the light-receiving regions, the one for producing an output signal bearing a same-sign relation to the push-pull signal;

a reverse region that serves to let a light beam enter, out of a plurality of the light-receiving regions, the one for producing an output signal bearing an opposite-sign relation to the push-pull signal;

a bright-dark contrast area where, out of light beams reflected from the optical recording medium, diffraction reflected light from a track borne on the surface of the optical recording medium enters; and a simple area where, out of the light beams reflected from the optical recording medium, simple reflected light from the optical recording medium enters and the diffraction reflected light does not enter, the light-receiving region including:

a push-pull light-receiving region where light diffracted by the bright-dark contrast area enters; and an offset light-receiving region where the light diffracted by the bright-dark contrast area does not enter but light diffracted by the simple region enters, and the diffraction element including:

a first diffraction region for diffracting incident light so that it can be directed to the push-pull light-receiving region; and a second diffraction region for diffracting incident light so that it can be directed to the offset light-receiving region, a plurality of the first diffraction regions and the second diffraction regions being arranged alternately in the tangential direction.

2. The optical pickup apparatus of claim 1, wherein a shape of the second diffraction region is so determined that a quantity of light entering the second diffraction region is proportional to an amount of deviation of the objective lens from the track.

3. The optical pickup apparatus of claim 2, wherein, in the light-receiving element is formed an independent light-receiving region from which an output signal is not used for push-pull signal calculation, and the diffraction element includes:

an independent diffraction region that is formed centrally of the diffraction element in the radial direction, and diffracts the incident light so that it can be directed to the independent light-receiving region; and the second diffraction region that is formed outwardly from the independent diffraction region in the radial direction.

4. The optical pickup apparatus of claim 1, wherein the diffraction element includes regions of which each constitutes at least part of either of the forward region and the reverse region, and at least part of the regions is rectangularly formed so that the tangential direction becomes its lengthwise direction.

5. The optical pickup apparatus of claim 1, wherein, in the diffraction element, a plurality of the forward regions and the reverse regions are arranged alternately in a radial direction which is parallel to the diffraction element and perpendicular to the tangential direction.

6. The optical pickup apparatus of claim 5, wherein the diffraction regions constitute:

a first array and a second array in which a plurality of the forward regions and the reverse regions are arranged alternately in the tangential direction; and a second array in which a plurality of the forward regions and the reverse regions are arranged alternately in the radial direction.

7. The optical pickup apparatus of claim 1, wherein the light-receiving region receives at least one of + first order diffraction light and − first order diffraction light resulting from diffraction in the diffraction element.

8. The optical pickup apparatus of claim 1, wherein the light-receiving element further includes a focus error detecting region for detecting a focus error, and the diffraction element further includes a focus-error diffraction region for diffracting incident light so that it can be directed to the focus error detecting region.

9. The optical pickup apparatus of claim 8, wherein, in response to an output signal from the focus error detecting region, the control-driving section produces a focus error signal by a knife edge method.

10. The optical pickup apparatus of claim 8, wherein, in response to an output signal from the focus error detecting region, the control-driving section produces a focus error signal by a beam size method.

11. The optical pickup apparatus of claim 1, wherein the light source, the diffraction element, and the light-receiving element are combined in a single-piece unit.

* * * * *